US010484665B2

(12) United States Patent
Nobori et al.

(10) Patent No.: US 10,484,665 B2
(45) Date of Patent: *Nov. 19, 2019

(54) CAMERA PARAMETER SET CALCULATION METHOD, RECORDING MEDIUM, AND CAMERA PARAMETER SET CALCULATION APPARATUS

(71) Applicant: Panasonic Intellectual Property Management Co., Ltd., Osaka (JP)

(72) Inventors: Kunio Nobori, Osaka (JP); Nobuhiko Wakai, Osaka (JP); Satoshi Sato, Kyoto (JP); Takeo Azuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,298

(22) Filed: Apr. 13, 2018

(65) Prior Publication Data

US 2018/0309978 A1 Oct. 25, 2018

(30) Foreign Application Priority Data

Apr. 20, 2017 (JP) .................................. 2017-083889

(51) Int. Cl.
*H04N 13/246* (2018.01)
*G06T 7/80* (2017.01)
(Continued)

(52) U.S. Cl.
CPC .............. *H04N 13/246* (2018.05); *G06T 7/85* (2017.01); *H04N 13/239* (2018.05);
(Continued)

(58) Field of Classification Search
CPC ....... H04N 13/246; H04N 17/002; G06T 7/85
(Continued)

(56) References Cited

U.S. PATENT DOCUMENTS 6,023,276 A 2/2000 Kawai et al.
7,307,655 B1 12/2007 Okamoto et al.
(Continued)

FOREIGN PATENT DOCUMENTS

JP 6-167564 6/1994
JP 8-016783 1/1996
(Continued)

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. RA-3, No. 4, Aug. 4, 1987, pp. 323-344.
(Continued)

*Primary Examiner* — Michael Lee
(74) *Attorney, Agent, or Firm* — Wenderoth, Lind & Ponack, L.L.P.

(57) ABSTRACT

A camera parameter set calculation method includes acquiring a first image from a first camera, a second image from a second camera, first and second camera parameter sets of the first camera and the second camera, calculating three-dimensional coordinate sets on the basis of the first image, the second image, the first camera parameter set, and the second camera parameter set, determining first pixel coordinate pairs obtained by projecting the three-dimensional coordinate sets onto the first image and second pixel coordinate pairs obtained by projecting the three-dimensional coordinate sets onto the second image, calculating an evaluation value on the basis of the pixel values at the first pixel coordinate pairs and the pixel values at the second pixel coordinate pairs, and updating the first camera parameter set and the second camera parameter set on a basis of the evaluation value.

12 Claims, 17 Drawing Sheets

(51) Int. Cl.
*H04N 13/239* (2018.01)
*H04N 17/00* (2006.01)

(52) U.S. Cl.
CPC ............ *G06T 2207/10012* (2013.01); *G06T 2207/10024* (2013.01); *G06T 2207/30208* (2013.01); *H04N 17/002* (2013.01)

(58) Field of Classification Search
USPC ........................................................ 348/175
See application file for complete search history.

(56) References Cited

U.S. PATENT DOCUMENTS

| | | | | |
|---|---|---|---|---|
| 2011/0229013 | A1* | 9/2011 | Huang | H04N 13/0246 |
| | | | | 382/154 |
| 2012/0155750 | A1* | 6/2012 | Kim | G06T 7/85 |
| | | | | 382/154 |
| 2013/0038700 | A1* | 2/2013 | Horita | G02B 7/36 |
| | | | | 348/47 |
| 2015/0139556 | A1* | 5/2015 | Jeon | G06K 9/00791 |
| | | | | 382/218 |
| 2016/0154477 | A1* | 6/2016 | Nishida | G06F 3/0346 |
| | | | | 345/157 |
| 2018/0316906 | A1* | 11/2018 | Nobori | H04N 13/246 |

FOREIGN PATENT DOCUMENTS

| | | |
|---|---|---|
| JP | 2001-285692 | 10/2001 |
| JP | 2002-135765 | 5/2002 |
| JP | 2003-528304 | 9/2003 |
| JP | 2007-024647 | 2/2007 |
| JP | 2011-215082 | 10/2011 |
| JP | 2012-202694 | 10/2012 |
| WO | 2001/071280 | 9/2001 |

OTHER PUBLICATIONS

C. Zach et al., "A duality based approach for realtime TV-L1 optical flow", In Proceedings of the 29th DAGM conference on Pattern recognition, 2007, pp. 214-223.

Takashi Matsuyama et al., "Computer Vision", New Technology communications, Jun. 15, 1998, pp. 123-137 (Partial Translation).

* cited by examiner

THREE-DIMENSIONAL COORDINATES $(x_{an}, y_{an}, z_{an})$
CORRESPONDING TO nTH PAIR OF CORRESPONDING POINTS

CAMERA PARAMETER SET CALCULATION METHOD, RECORDING MEDIUM, AND CAMERA PARAMETER SET CALCULATION APPARATUS

BACKGROUND

1. Technical Field

The present disclosure relates to a camera parameter set calculation method, a recording medium, and a camera parameter set calculation apparatus.

2. Description of the Related Art

A driving safety support system of automobiles, a remote operation system of a mobile robot, and a security camera system for detecting a suspicious person, for example, require the image of the surroundings of the system and information about the three-dimensional coordinate sets corresponding to the image in order for a user and the system to make determination and perform control. A variety of techniques have been developed to acquire three-dimensional coordinate sets of an object by stereopsis for binocular vision based on the images captured by all of cameras of a compound eye camera. For example, refer to the following literatures: Japanese Unexamined Patent Application Publication No. 2001-285692 (hereinafter referred to as "PTL 1"); Japanese Unexamined Patent Application Publication No. 6-167564 (hereinafter referred to as "PTL 2"); Japanese Unexamined Patent Application Publication No. 2007-24647 (hereinafter referred to as "PTL 3"); Japanese Unexamined Patent Application Publication (Translation of PCT Application) No. 2003-528304 (hereinafter referred to as "PTL 4"); Roger Y. Tsai, "A Versatile Camera Calibration Technique for High-Accuracy 3D Machine Vision Metrology Using Off-the-Shelf TV Cameras and Lenses", Journal of Robotics and Automation, IEEE, August 1987, Vol. RA-3, No. 4, pp. 323-344 (hereinafter referred to as "NPL 1"); C. Zach, T. Pock, and H. Bischof, "A duality based approach for realtime TV-L1 optical flow", In Proceedings of the 29th DAGM conference on Pattern recognition, 2007, pp. 214-223 (hereinafter referred to as "NPL 2"); and Takashi Matsuyama et al., "Computer Vision" Shin-Gijutsu Communications K.K., pp. 123-137 (hereinafter referred to as "NPL 3"). To obtain the three-dimensional coordinate sets of an object by stereopsis for binocular vision, a camera parameter set of each of the cameras, which is a set of a variety of camera parameters, is required. As used herein, the term "coordinate pair" refers to a single combination of coordinates for two axes. Similarly, the term "coordinate set" refers to a single combination of coordinates for three axes. Calculation of the camera parameter set is referred to as "camera calibration". Camera calibration is described in detail in PTL 4 and NPL 1.

For example, according to the camera calibration technique described in NPL 1, pairs each including the three-dimensional coordinate set of a reference point serving as a reference for calibration and the pixel coordinate pair corresponding to the reference point are prepared and are input. In addition, the distance between a point obtained by projecting the reference point of a three-dimensional coordinate set onto the image by using the camera parameters and the pixel coordinate pair corresponding to the reference point (the distance is also referred to as "reprojection error") is calculated. Furthermore, a camera parameter set that minimizes the sum of reprojection errors of the reference points is calculated.

SUMMARY

According to existing calibration techniques, a reference point, a pair including the three-dimensional coordinate set of the reference point and the pixel coordinate pair corresponding to the reference point are needed. However, if the three-dimensional position of the reference point changes due to aged deterioration, an external force, a temperature change, or the like, and the three-dimensional coordinate set after change are unknown, it is difficult to correctly perform calibration.

One non-limiting and exemplary embodiment provides a camera parameter set calculation method, a camera parameter set calculation program, and a camera parameter set calculation apparatus that enable self-calibration of a camera without providing the three-dimensional coordinate set of a reference point in advance.

In one general aspect, the techniques disclosed here feature, a camera parameter set calculation method includes (a1) acquiring a first image captured by a first camera and a second image captured by a second camera, (a2) acquiring a first camera parameter set including one or more camera parameters of the first camera and a second camera parameter set including one or more camera parameters of the second camera, (a3) calculating three-dimensional coordinate set on an object on a basis of the first image, the second image, the first camera parameter set, and the second camera parameter set, the first image including an image of the object, the second image including an image of the object, (a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set, (a5) calculating an evaluation value on a basis of pixel values at the first pixel coordinate pairs in the first image and pixel values at the second pixel coordinate pairs in the second image, (a6) updating the first camera parameter set and the second camera parameter set on a basis of the evaluation value, and (a7) outputting the updated first camera parameter set and second camera parameter set. At least one of processes (a1) to (a7) is performed by a processor.

According to the camera parameter set calculation technique of the present disclosure, a camera can perform self-calibration without the three-dimensional coordinate set of a reference point provided in advance.

It should be noted that general or specific embodiments may be implemented as a system, an apparatus, a method, an integrated circuit, a computer program, a computer-readable storage medium (such as a recording disk), or any selective combination thereof. The computer-readable recording medium includes a nonvolatile recording medium, such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
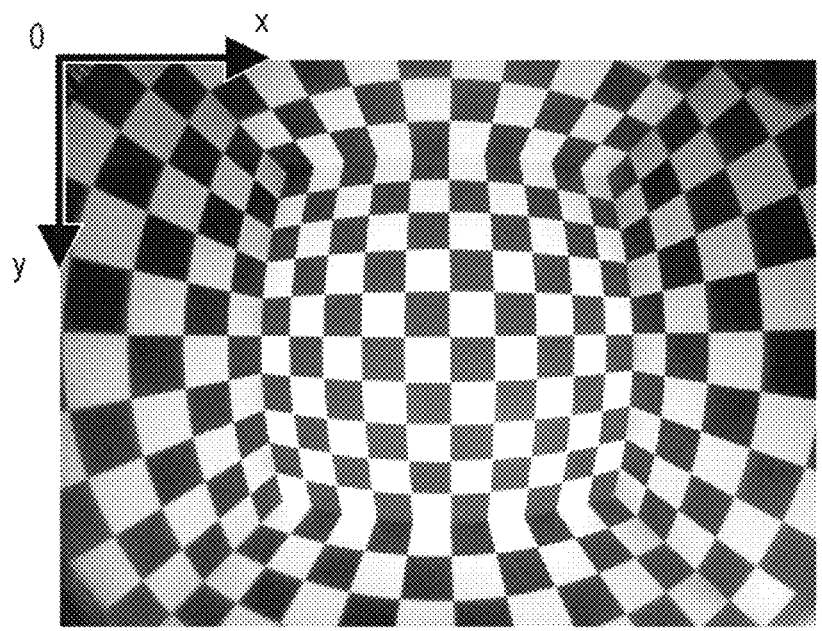
FIG. 1 is a schematic illustration of an existing calibration index.

Underlying Knowledge Forming Basis of the Present Disclosure

The present inventors have found that the following problem arises in the camera calibration described in the "Background" section. More specifically, in order for the user and the system to make determination and perform control in, for example, a driving safety support system for an automobile, a remote control system for a mobile robot, or a security camera system for detecting a suspicious person, the image of the surroundings of the system and the three-dimensional coordinate information corresponding to the image are needed. In particular, when an object that is monitored, such as a person and a vehicle, moves and, at the same time, the system itself moves together with, for example, an automobile or a robot having the system mounted therein, it is important to acquire the images with wider viewing angles and the three-dimensional coordinate sets corresponding to the images.

To acquire the three-dimensional coordinate set corresponding to images, so-called stereopsis for binocular vision is used, in general. In stereopsis for binocular vision, two images are acquired using two cameras that are located at different viewpoints such that the fields of view overlap. In addition, a pair of corresponding points included in the two images is estimated, and the three-dimensional coordinate set of a point on the object for the pair of corresponding points are calculated by using the pair of corresponding points and information such as the positions and orientations of the cameras obtained in advance.

Example of Existing Calibration Technique

For example, in order to acquire three-dimensional coordinate sets of an object from images captured by a compound eye camera through stereopsis for binocular vision, a camera parameter set of each of the cameras is needed. The term "camera parameter set" refers to the model of a camera and parameters corresponding to the model. The model of a camera and the parameters corresponding to the model represent a relationship between the three-dimensional coordinate set of a certain point in an image capturing space and the two-dimensional coordinate pair (also referred to as "pixel coordinate pair") of a point on the image obtained by the camera. Calculation of the camera parameter set is referred to as "camera calibration".

More specifically, the camera parameter set including two camera parameter sets, that is, an external parameter set and an internal parameter set. The external parameter set represents a positional relationship between a three-dimensional world coordinate system determined on the basis of the image capturing space of the camera and a three-dimensional camera coordinate system determined on the basis of the camera. The internal parameter set represents the relationship between the three-dimensional coordinate set of the object in the camera coordinate system and the position of the image of the object in the image captured by the camera.

In the camera calibration technique described in NPL 1, pairs each including the three-dimensional coordinate set of the reference point and the pixel coordinate pair corresponding to the reference point are prepared. These pairs serve as input elements, and a camera parameter set is calculated that minimizes the sum of the distances (the reprojection error) between the points obtained by projecting the reference points of the three-dimensional coordinate sets onto the image by using the camera parameters and the pixel coordinate pairs corresponding to the reference points.

In order to obtain the pairs each including the three-dimensional coordinate set of a reference point and the pixel coordinate pair corresponding to the reference point, a calibration index of a specific pattern is used, in general. An example of the calibration index is illustrated in FIG. 1. In the example illustrated in FIG. 1, grid-like patterns are arranged inside a box-shaped object at predetermined intervals. A grid point, that is, a corner of the pattern is defined as a reference point, and the design value of the three-dimensional coordinate set of the grid point corresponding to the reference point or the three-dimensional coordinate set of a reference point measured after setting the reference point is held. In addition, the image of the reference point is captured by the camera, and the pixel coordinate pair of the image of the grid point corresponding to the reference point is estimated through image processing. In this manner, the information regarding a pair including the three-dimensional coordinate set of the reference point and pixel coordinate pair corresponding to the reference point is obtained. The calibration technique using such a calibration index is effective for calibration in, for example, a factory after the camera is manufactured because highly accurate calibration can be performed, although the calibration technique requires equipment having a calibration index.

Note that, in addition to calibration at the time of manufacturing, camera calibration is needed if the camera parameter set has changed during the operation of an apparatus having the camera mounted therein due to, for example, the influence of aged deterioration, deformation of the apparatus caused by an external force, and a temperature change. For a driving safety support system of an automobile, a remote control system of a mobile robot, a security camera system and the like, it is desirable that the calibration technique do not require equipment or the like having the calibration index and do not need manual operation. That is, a calibration technique using self-calibration is desirable. As used herein, the term "self-calibration" refers to automatic updating of the camera parameter set performed by a system including the camera.

PTL 4 discloses a self-calibration technique in which a system automatically calibrates a stereo camera mounted in a vehicle. According to the technique described in PTL 4, instead of using a calibration index of a specific pattern, such as a grid pattern, a stationary object in the field of view of the camera is stored as a target of calibration. If the position of the target of calibration changes, the camera performs self-calibration by using the information regarding the three-dimensional coordinate set of the target of calibration.

However, according to an existing calibration technique, it is assumed that the three-dimensional coordinate set of the target of calibration is obtained in advance and stay unchanged. Consequently, if the three-dimensional coordinate set of the target of calibration change due to, for example, the influence of aged deterioration, an external force, or a temperature change, correct calibration cannot be performed. To solve the above-described problem, the present inventors invented a technique for enabling a camera to perform self-calibration even when the three-dimensional coordinate set of the calibration reference point is not provided in advance, as described below.

According to an aspect of the present disclosure, a camera parameter set calculation method includes (a1) acquiring a first image captured by a first camera and a second image captured by a second camera, (a2) acquiring a first camera parameter set including one or more camera parameters of the first camera and a second camera parameter set including one or more camera parameters of the second camera, (a3) calculating three-dimensional coordinate sets on an object on a basis of the first image, the second image, the first camera parameter set, and the second camera parameter set, the first image including an image of the object, the second image including an image of the object (a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set, (a5) calculating an evaluation value on a basis of pixel values at the first pixel coordinate pairs in the first image and pixel values at the second pixel coordinate pairs in the second image, (a6) updating the first camera parameter set and the second camera parameter set on a basis of the evaluation value, and (a7) outputting the updated first camera parameter set and second camera parameter set. At least one of processes (a1) to (a7) is performed by a processor.

According to the above-described aspect, the camera parameter set of the first camera and the camera parameter set of the second camera can be calculated on the basis of the evaluation value. The pixel coordinate pairs used for calculating the evaluation value are not preset reference. Accordingly, in the calculation process of the camera parameter sets, equipment having a calibration index including a known reference point is not needed. That is, according to the present aspect, since the three-dimensional coordinate sets of the reference points obtained in advance are not used, self-calibration of the camera can be correctly performed regardless of a change in the reference point due to the influence of aged deterioration, an external force, a temperature change or the like.

For example, when the first camera parameter set and the second camera parameter set are correct, the pixel value of the first image at the first pixel coordinate pair corresponding to the three-dimensional coordinate set of a given point and the pixel value of the second image at the second pixel coordinate pair corresponding to the three-dimensional coordinate set are the same. As the difference between the first camera parameter set or the second camera parameter set and the correct solution value increases, that is, as an error in the first camera parameter set or the second camera parameter set increases, differences between the pixel values in the first image and the second image increases. Accordingly, if the first camera parameter set or the second camera parameter set includes an error, the first camera parameter set and the second camera parameter set are updated such that for example, the error is minimized on the basis of the differences between the pixel values of the first image and the second image. In this manner, the correct camera parameter sets can be obtained. That is, the first and second cameras can be calibrated.

In addition, in the camera parameter set calculation method according to the aspect of the present disclosure, in process (a5), the first pixel coordinate pairs may be determined by coordinate-transforming each of the three-dimensional coordinate sets using one or more camera parameters included in the first camera parameter set, and the second pixel coordinate pairs may be determined by coordinate-transforming each of the three-dimensional coordinate sets using one or more camera parameters included in the second camera parameter set.

According to the above-described aspect, calculation of the first pixel coordinate pair corresponding to the three-dimensional coordinate set and calculation of the second pixel coordinate pair corresponding to the three-dimensional coordinate set are facilitated.

In addition, in the camera parameter set calculation method according to the aspect of the present disclosure, the three-dimensional coordinate sets may be represented by (x1, y1, z1) . . . (xi, yi, zi) . . . (xn, yn, zn), the first pixel coordinate pairs may be represented by (u11, v11) . . . (u1i, v1i) . . . (u1n, y1n), and the second pixel coordinate pairs may be represented by (u21, v21) . . . (u2i, v2i) . . . (u2n, v2n), where 1<i≤n, and i and n are natural numbers. The three-dimensional coordinate set (xi, yi, zi) may correspond to the pixel coordinate pair (u1i, v1i), the three-dimensional coordinate set (xi, yi, zi) may correspond to the pixel coordinate pair (u2i, v2i), the pixel value at the pixel coordinate pair (u1i, v1i) may be represented by I1(u1i, v1i), and the pixel value at the pixel coordinate pair (u2i, v2i) may be represented by I2(u2i, v2i). In process (a6), the evaluation value may be calculated on the basis of a difference Di between the pixel values I1(u1i, v1i) and I2(u2i, v2i).

According to the above-described aspect, if the pixel value of the first image at the first pixel coordinate pair differs from the pixel value of the second image at the second pixel coordinate pair, it can be determined that the first camera parameter set and the second camera parameter set have an error from the true value. Thus, it can be easily determined whether the first camera parameter set and the second camera parameter set are acceptable or not. Furthermore, for example, by changing or updating the first camera parameter set and the second camera parameter set so as to reduce the difference between the pixel values, the first camera parameter set and the second camera parameter set can be set to the suitable ones.

In addition, in the camera parameter set calculation method according to the aspect of the present disclosure, in process (a6), the evaluation value may be calculated on the basis of $\Sigma_{i=1}^{n} Di$.

According to the above-described aspect, by using the differences, the accuracy of the evaluation value is improved. Furthermore, by, for example, updating the first camera parameter set and the second camera parameter set so as to reduce the sum of the differences, the first camera parameter set and the second camera parameter set can be optimized.

In addition, in the camera parameter set calculation method according to the aspect of the present disclosure, in process (a6), the evaluation value may be calculated on the basis of $\Sigma_{i=1}^{n} |Di|$.

According to the above-described aspect, by using the absolute value of the difference, it is prevented that the differences are canceled out when the evaluation value is calculated. As a result, a correct evaluation value can be calculated.

In addition, in the camera parameter set calculation method according to the aspect of the present disclosure, in process (a6), the evaluation value may be calculated on the basis of $\Sigma_{i=1}^{n} (Di \times Di)$.

According to the above-described aspect, since the squared difference is always a positive value, it is prevented that the differences are canceled out when the evaluation value is calculated. Furthermore, as the difference increases, the influence of the difference on the evaluation value increases. As the difference decreases, the influence of the difference on the evaluation value decreases. Accordingly, the evaluation value can reflect the emphasized difference.

In addition, in the camera parameter set calculation method according to the aspect of the present disclosure, (b1) information about detected temperature may be acquired from a temperature sensor before processes (a1) to (a7) are performed, and (b2) processes (a1) to (a7) may be started on a basis of the acquired information about detected temperature.

According to the above-described aspect, if an event that has an influence on the camera parameter set, such as a change in temperature, occurs, the camera parameter set is automatically updated and, thus, the camera can be calibrated.

In addition, in the camera parameter set calculation method according to the aspect of the present disclosure, (c1) information about detected impact may be acquired from an impact sensor before processes (a1) to (a7) are performed, and (c2) processes (a1) to (a7) may be started on a basis of the acquired information about detected impact.

According to the above-described aspect, if an event that has an influence on the camera parameter set, such as an impact, occurs, the camera parameter set is automatically updated and, thus, the camera can be calibrated.

In addition, in the camera parameter set calculation method according to the aspect of the present disclosure, (d1) information about time may be acquired from a timer before processes (a1) to (a7) are performed, and (d2) processes (a1) to (a7) may be started on a basis of the acquired information about time.

According to the above-described aspect, if an event that has an influence on the camera parameter set, such as a change in the camera over time, occurs, the camera parameter set is automatically updated and, thus, the camera can be calibrated.

According to an aspect of the present disclosure, a camera parameter set calculation method includes (a1) acquiring a first image captured by a first camera and a second image captured by a second camera, (a2) acquiring a first camera parameter set including one or more parameters of the first camera and a second camera parameter set including one or more camera parameters of the second camera, (a3) repeating estimation of a pair of corresponding points that are a first corresponding point in the first image and a second corresponding point in the second image, to determine which points in the first image and in the second image indicates images of an identical point on the object, based on a pixel value at the first corresponding point and a pixel value at the second corresponding point, thereby pairs of corresponding points being provided, (a4) calculating three-dimensional coordinate sets each corresponding to the pairs of corresponding points on a basis of the first camera parameter set and the second camera parameter set, (a5) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set, (a6) calculating an evaluation value on a basis of pixel values at the first pixel coordinate pairs in the first image and pixel values at the second pixel coordinate pairs in the second image, (a7) updating the first camera parameter set and the second camera parameter set on a basis of the evaluation value, and (a8) outputting the updated first camera parameter set and second camera parameter set. At least one of processes (a1) to (a8) is performed by a processor.

According to an aspect of the present disclosure, a non-transitory computer-readable recording medium storing a control program executable by an apparatus including a processor is provided. The control program includes code to perform (a1) acquiring a first image captured by a first camera and a second image captured by a second camera, (a2) acquiring a first camera parameter set including one or more camera parameters of the first camera and a second camera parameter set including one or more camera parameters of the second camera, (a3) calculating three-dimensional coordinate sets on an object on a basis of the first image, the second image, the first camera parameter set, and the second camera parameter set, the first image including an image of the object, the second image including an image of the object, (a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set, (a5) calculating an evaluation value on a basis of pixel values at the first pixel coordinate pairs in the first image and pixel values at the second pixel coordinate pairs in the second image, (a6) updating the first camera parameter set and the second camera parameter set on a basis of the evaluation value, and (a7) outputting the updated first camera parameter set and second camera parameter set. According to the above-described aspect, an effect the same as that provided by the above-described camera parameter set calculation method can be obtained.

According to an aspect of the present disclosure, a camera parameter set calculation apparatus includes a processing circuit. The processing circuit performs the following operations:

(a1) acquiring a first image captured by a first camera and a second image captured by a second camera;

(a2) acquiring a first camera parameter set including one or more camera parameters of the first camera and a second camera parameter set including one or more camera parameters of the second camera;

(a3) calculating three-dimensional coordinate sets on an object on a basis of the first image, the second image, the first camera parameter set, and the second camera parameter set, the first image including an image of the object, the second image including an image of the object;

(a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a5) calculating an evaluation value on a basis of pixel values at the first pixel coordinate pairs in the first image and pixel values at the second pixel coordinate pairs in the second image;

(a6) updating the first camera parameter set and the second camera parameter set on a basis of the evaluation value; and (a7) outputting the updated first camera parameter set and second camera parameter set. According to the above-described aspect, an effect the same as that provided by the above-described camera parameter set calculation method can be obtained.

According to an aspect of the present disclosure, a camera parameter set calculation apparatus includes a processing circuit. The processing circuit performs the following operations:

(a1) acquiring a first image captured by a first camera and a second image captured by a second camera;

(a2) acquiring a first camera parameter set including one or more camera parameters of the first camera and a second camera parameter set including one or more camera parameters of the second camera;

(a3) repeating estimation of a pair of corresponding points that are a first corresponding point in the first image and a second corresponding point in the second image, to determine which points in the first image and in the second image indicates images of an identical point on the object, based on a pixel value at the first corresponding point and a pixel value at the second corresponding point, thereby pairs of corresponding points being provided;

(a4) calculating three-dimensional coordinate sets each corresponding to the pairs of corresponding points on a basis of the first camera parameter set and the second camera parameter set;

(a5) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a6) calculating an evaluation value on a basis of pixel values at the first pixel coordinate pairs in the first image and pixel values at the second pixel coordinate pairs in the second image;

(a7) updating the first camera parameter set and the second camera parameter set on a basis of the evaluation value; and (a8) outputting the updated first camera parameter set and second camera parameter set.

It should be noted that general or specific embodiments may be implemented as a system, an apparatus, a method, an integrated circuit, a computer program, a computer-readable storage medium (such as a recording disk), or any selective combination thereof. The computer-readable recording medium includes a nonvolatile recording medium, such as a compact disc-read only memory (CD-ROM).

A camera parameter set calculation apparatus and the like according to embodiments are described below with reference to the accompanying drawings. It is to be noted that each of the embodiments described below represents a general or specific example. A value, a shape, a material, a constituent element, the positions and the connection form of the constituent elements, steps (a process flow), and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element. In addition, the word "substantially" to modify, for example, the word "parallel" or "perpendicular" may be used in the following description of the embodiments. For example, "substantially parallel" encompasses perfectly parallel as well as not perfectly parallel but roughly parallel with a maximum allowance of a few percent. The same applies to other words modified by the word "substantially".

EMBODIMENTS

Figure 2:
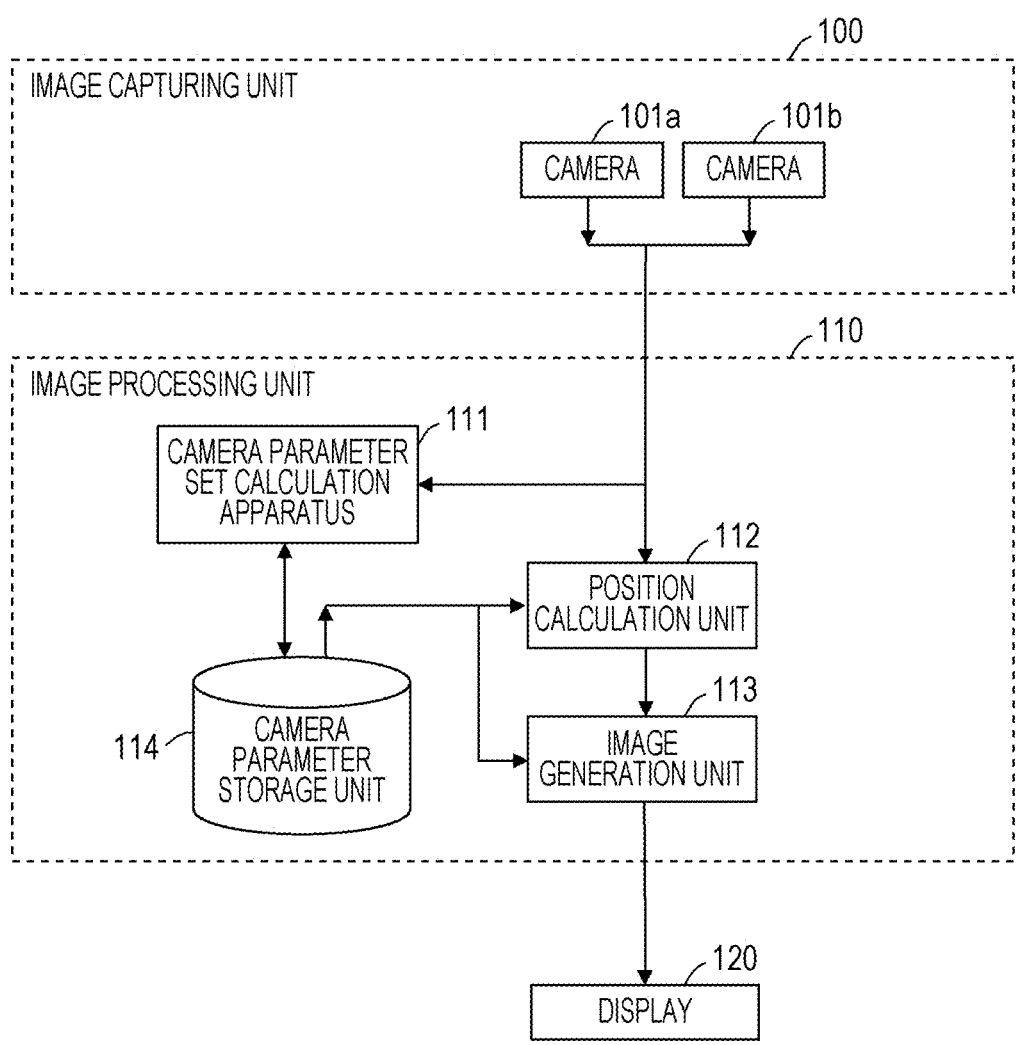
FIG. 2 is a block diagram illustrating the functional configuration of a compound eye camera system according to an embodiment.

1. Configuration of Compound Eye Camera System
1-1. Architecture of Compound Eye Camera System A compound eye camera system 10 including a camera parameter set calculation apparatus 111 according to an embodiment of the present disclosure is described below. Although not limited to this camera system, according to the present embodiment, the compound eye camera system 10 is an in-vehicle compound eye camera system using the camera parameter set calculation apparatus 111. FIG. 2 is a block diagram illustrating the functional configuration of the compound eye camera system 10 including the camera parameter set calculation apparatus 111 according to the present embodiment. As illustrated in FIG. 2, the compound eye camera system 10 includes an image capturing unit 100, an image processing unit 110, and a display 120.

The image capturing unit 100 captures and acquires an image and outputs the image to the image processing unit 110. The image capturing unit 100 includes two or more cameras 101. According to the present embodiment, the image capturing unit 100 includes two cameras 101a and 101b. The image processing unit 110 processes the image captured by the image capturing unit 100 and outputs the result of processing to the display 120 or the like. The image processing unit 110 includes the camera parameter set calculation apparatus 111, a position calculation unit 112, an image generation unit 113, and a camera parameter storage unit 114. The camera parameter set calculation apparatus 111 is also referred to as a "self-calibration unit". In addition, the display 120 displays images and the like output from the image processing unit 110. The display 120 may be formed from a display panel, such as a liquid crystal panel or an organic or inorganic electro luminescence (EL) panel. Note that the suffixes a to d are used to distinguish similar constituent elements. However, hereinafter, when these constituent elements need not be distinguished from one another, only the reference symbol without any suffix may be used as appropriate.

The compound eye camera system 10 mainly performs two types of operations: image generation and self-calibration. At the time of image generation, the image capturing unit 100 captures an image and outputs the image to the image processing unit 110. The image processing unit 110 calculates three-dimensional coordinate sets of an object from the input image and generates an image on the basis of the calculated three-dimensional coordinate sets. Thereafter, the image processing unit 110 outputs the generated image and displays the image on the display 120. At the time of self-calibration, the image capturing unit 100 captures an image and outputs the image to the image processing unit 110. The camera parameter set calculation apparatus 111 of the image processing unit 110 updates the camera parameter set stored in the camera parameter storage unit 114. Note that the two types of operations, namely, image generation and self-calibration may be performed simultaneously or separately.

1-2. Configuration of Image Capturing Unit

Figure 3A:
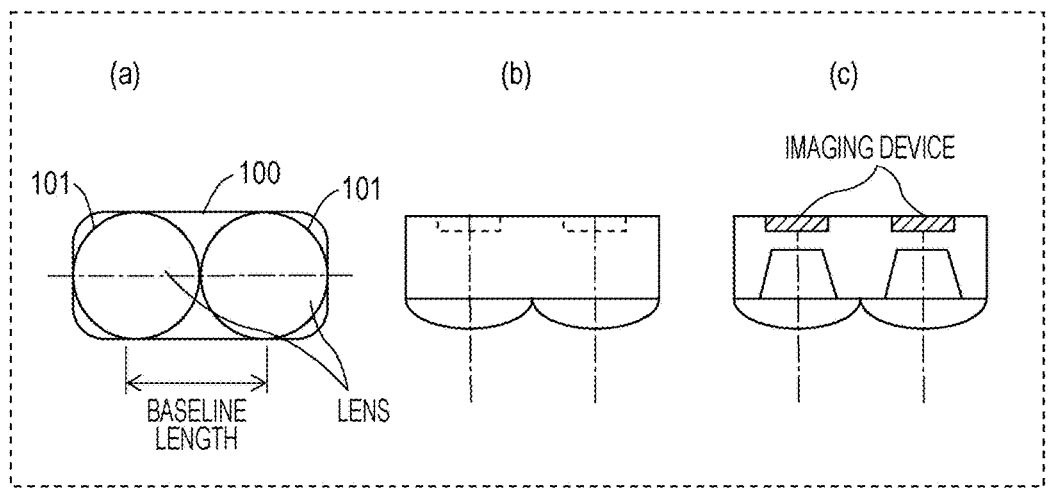
FIG. 3A is a schematic illustration of an example of the configuration of an image capturing unit according to the embodiment.

FIG. 3A is a schematic illustration of an example of the configuration of the image capturing unit 100 of the compound eye camera system 10. In FIG. 3A, an example of the image capturing unit 100 having a configuration in which two cameras 101 are integrated into one unit is illustrated. FIG. 3A(a) is a front view of the image capturing unit 100. FIG. 3A(b) is a side view of the image capturing unit 100, and FIG. 3A(c) is a cross-sectional view of the image capturing unit 100. The cross-sectional view is taken along a plane crossing a line passing through the centers of two lenses of the two cameras 101 of the image capturing unit 100. The lens of each of the two cameras 101 constituting the image capturing unit 100 is a fisheye lens.

Figure 3B:
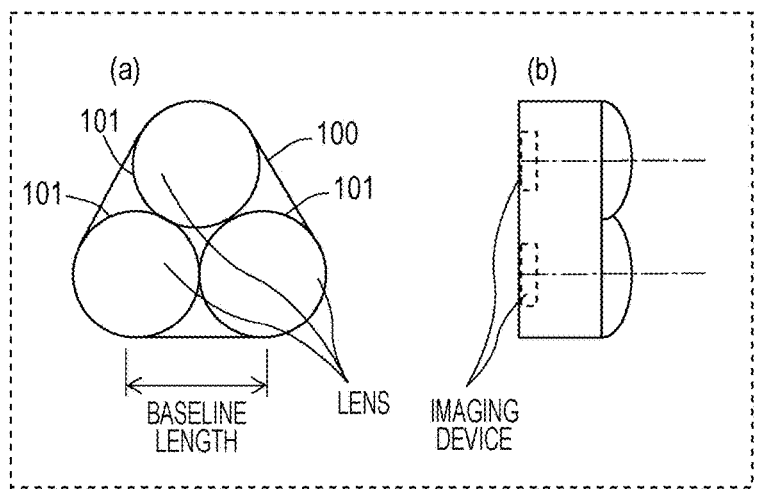
FIG. 3B is a schematic illustration of another example of the configuration of the image capturing unit according to the embodiment.

While the compound eye camera system 10 according to the present embodiment is described with reference to the image capturing unit 100 being a two-eye camera including two cameras, the number of cameras included in the image capturing unit 100 is not limited to two. The number of cameras may be three or more. That is, the image capturing unit 100 may be configured to include two or more cameras. For example, as illustrated in FIG. 3B, the image capturing unit 100 may be a tri-eye camera configured with three cameras 101. Such an image capturing unit 100 has a configuration in which three cameras 101 are integrated into one body, instead of having two cameras 101. In FIG. 3B, FIG. 3B(a) is a front view of the image capturing unit 100, and FIG. 3B(b) is a side view of the image capturing unit 100. Note that as illustrated in FIGS. 3A and 3B, the distance between the optical axes of the cameras 101 that are adjacent to each other is referred to as a "baseline length". In the image capturing unit 100, an imaging device is disposed on the optical axis of each of the cameras 101. In addition, in the image capturing unit 100, the cameras 101 need not be integrated into one body and may be separately arranged. Furthermore, the cameras 101 that are separately arranged need not be disposed so as to be close to each other.

Any imaging device having a configuration that receives light incident through the lens of the camera 101 and forms an image from the received light can be employed. For example, the image sensor may be a complementary metal-oxide semiconductor (CMOS) image sensor or a charge coupled device (CCD) sensor.

The image capturing unit 100 includes two cameras 101a and 101b each having a fisheye lens with a viewing angle of approximately 180 degrees. The two cameras 101a and 101b are arranged as illustrated in FIG. 3A. Each of the cameras 101a and 101b captures an image in the field of view, and two images are output (hereinafter, the image is also referred to as a "camera image").

1-3. Configuration of Image Processing Unit

The configuration of the image processing unit 110 is described below with reference to FIG. 2. As described above, the image processing unit 110 includes the camera parameter set calculation apparatus 111, the position calculation unit 112, the image generation unit 113, and the camera parameter storage unit 114.

The camera parameter storage unit 114 prestores at least the camera parameter set of each of the cameras 101a and 101b and occlusion information which is information regarding an area occluded in the camera image by the image capturing unit 100. The camera parameter set of each of the cameras 101a and 101b may include an external parameter set, such as the position and orientation of the camera, and an internal parameter set, such as the distortion and focal length of the lens of the camera.

The camera parameter set calculation apparatus 111, which serves as the self-calibrating unit, updates the camera parameter set stored in the camera parameter storage unit 114 by using the images captured by the cameras 101a and 101b and an initial camera parameter sets of the cameras 101a and 101b stored in the camera parameter storage unit 114. The initial camera parameter sets may be the camera parameter sets of the cameras 101a and 101b already stored in the camera parameter storage unit 114. For example, the initial camera parameter sets may be camera parameter sets that are set at the time of design of the cameras 101a and 101b or may be camera parameter sets that are set for the cameras 101a and 101b at the use stage.

The position calculation unit 112 estimates a pair of corresponding points in two camera images by using the two camera images output from the cameras 101a and 101b. When images of the same object appears in two camera images taken by two cameras, that is, when the first camera image taken by the first camera has the first image of the same point on the object, at the first point in the first camera image and the second camera image taken by the second camera has the second image of the same point on the object, at the second point in the second camera image, each of the first point and the second point at which these two images of the same point on the object are shown is called a corresponding point, and the pair of the two points at which these two images of the same point on the object are shown is called a pair of corresponding points. More specifically, estimating the pair of corresponding points means calculating the pixel coordinate pair of each of the corresponding points included in the pair of corresponding points. In addition, the position calculation unit 112 reads the camera parameter sets of the cameras 101a and 101b from the camera parameter storage unit 114. The position calculation unit 112 calculates a location of a point on the three-dimensional object whose images are shown in the camera images, that is, a three-dimensional coordinate set of the point on the object, on the basis of the pair of corresponding points and the external parameter set and the internal parameter set included in each of the camera parameter sets. Thereafter, the position calculation unit 112 outputs the calculated three-dimensional coordinate set and the pixel coordinate pairs of the corresponding points together as the positional information of the point on the three-dimensional object, that is, the point on the object. Each of the points is not necessary recognized as a dot. Each of the points can mean a portion. In other words, the point on the three-dimensional object can be a portion on the three-dimensional object, the point on the object can be a portion on the object, the corresponding point can be a corresponding portion, and the pair of corresponding points can be a pair of corresponding portions.

The image generation unit 113 generates a composite image on the basis of the two camera images and the positional information of the three-dimensional object calculated by the position calculation unit 112. Thereafter, the image generation unit 113 outputs the composite image. More specifically, the composite image to be generated is the image of a three-dimensional object in the image capturing space and is a composite image based on three-dimensional coordinate sets of the three-dimensional object.

Each of the constituent elements constituting the image processing unit 110 in the compound eye camera system 10 illustrated in FIG. 2 may be implemented by hardware, such as an electronic circuit or an integrated circuit, or software, such as a program executed on a computer.

Figure 4:
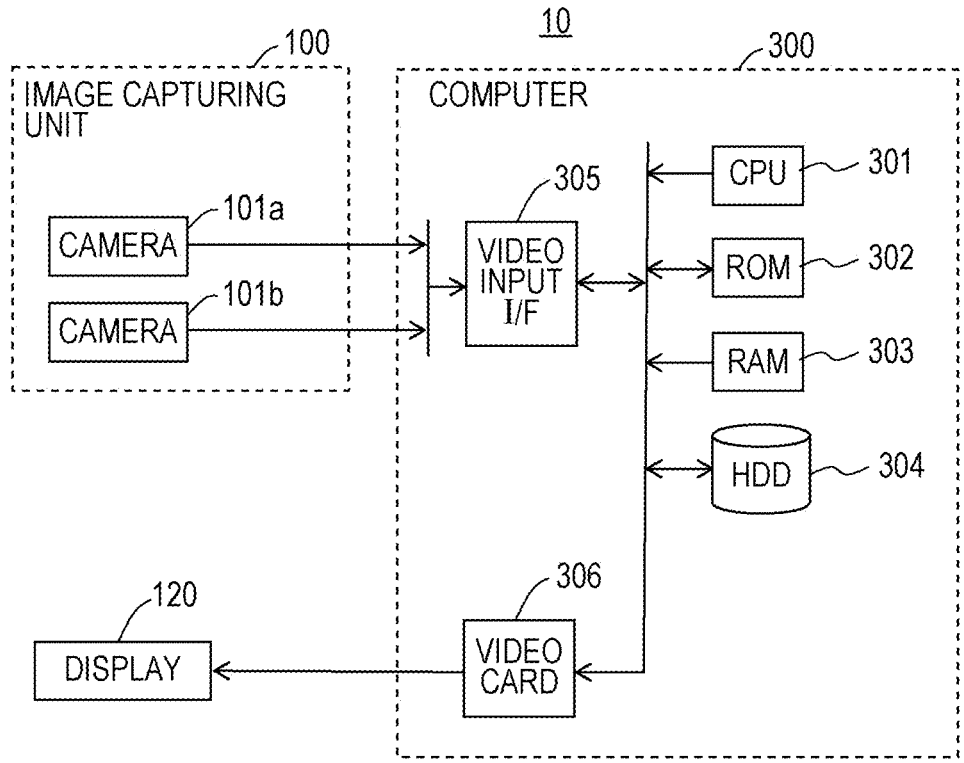
FIG. 4 is a block diagram of an image processing unit of the compound eye camera system provided by a computer according to the embodiment.

An example of the hardware configuration of the image processing unit 110 is described below with reference to FIG. 4. FIG. 4 illustrates an example of the hardware configuration of the compound eye camera system 10. The compound eye camera system 10 includes the image capturing unit 100, a computer 300 corresponding to the image processing unit 110, and the display 120. In the compound eye camera system 10, the image capturing unit 100 captures an image and outputs the image, and the computer 300 operates as the image processing unit 110. Thus, an image is generated and output. The display 120 displays the image generated by the computer 300.

The computer 300 includes a central processing unit (CPU) 301, a read only memory (ROM) 302, a random access memory (RAM) 303, a hard disk drive (HDD) 304, a video input interface (I/F) 305, and a video card 306.

A program that operates the computer 300 is held in the ROM 302 or the HDD 304 in advance. The program is loaded from the ROM 302 or the HDD 304 onto the RAM 303 by the CPU 301 (a processor).

The CPU 301 executes each of coded instructions in the program loaded onto the RAM 303. In accordance with execution of the program, the video input I/F 305 loads an image captured by the image capturing unit 100 into the RAM 303. The video card 306 processes the image generated in accordance with the execution of the program and outputs the image to the display 120, which displays the image.

Note that instead of being stored in the ROM 302, which is a semiconductor device, or the HDD 304, the computer program may be stored in a recording medium, such as a CD-ROM. Alternatively, the computer program may be transmitted via a wired network, a wireless network, a broadcast, or the like, and may be loaded into the RAM 303 of the computer 300.

2. Operation Performed by Compound Eye Camera System

The operation performed by the compound eye camera system 10 is described below. More specifically, the operation performed at the time of image generation and the operation performed at the time of self-calibration in the compound eye camera system 10 are described below in sequence.

2-1. Operation for Image Generation

Figure 5:
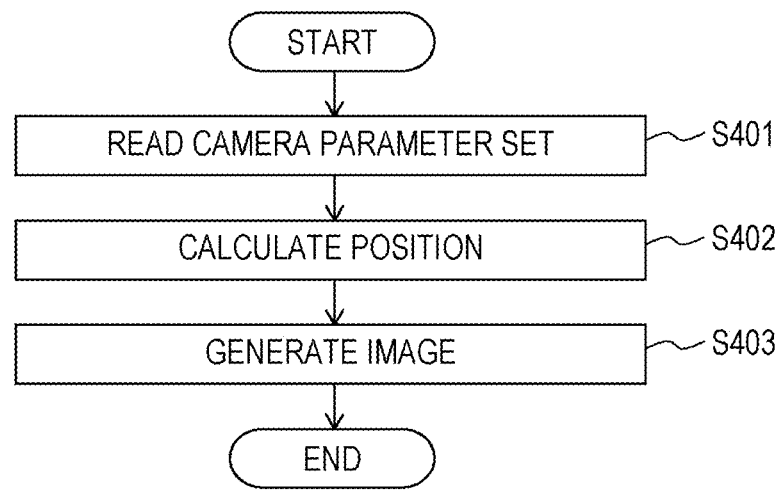
FIG. 5 is a flowchart illustrating an example of the flow of the operation performed to generate image by the image processing unit according to the embodiment.

The operation performed by the compound eye camera system 10 at the time of image generation is described with reference to FIG. 5. FIG. 5 is a flowchart illustrating an example of the operation performed by the image processing unit 110 of the compound eye camera system 10 at the time of image generation. As illustrated in FIG. 5, the operation performed at the time of image generation includes a process for reading the camera parameter set in step S401, a process for calculating a position in step S402, and a process for generating an image in step S403. Each of the operations illustrated in FIG. 5 may be executed by the computer 300 illustrated in FIG. 4.

Although not limited to the following, according to the present embodiment, an example in which the compound eye camera system 10 is installed in an automobile is described. More specifically, the compound eye camera system 10 acquires a camera image behind the automobile and the three-dimensional coordinate sets corresponding to the camera image, detects an obstacle, and displays the result of detection on a display disposed in the automobile.

In this manner, the compound eye camera system 10 presents the situation behind the vehicle body to the driver (the user).

Figure 6A:
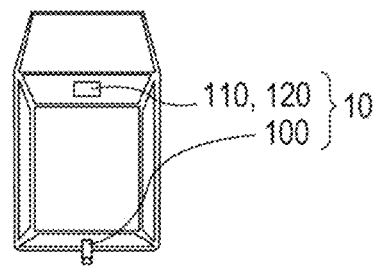
FIG. 6A is a schematic illustration of an installation example of the compound eye camera system according to the embodiment.
Figure 6B:
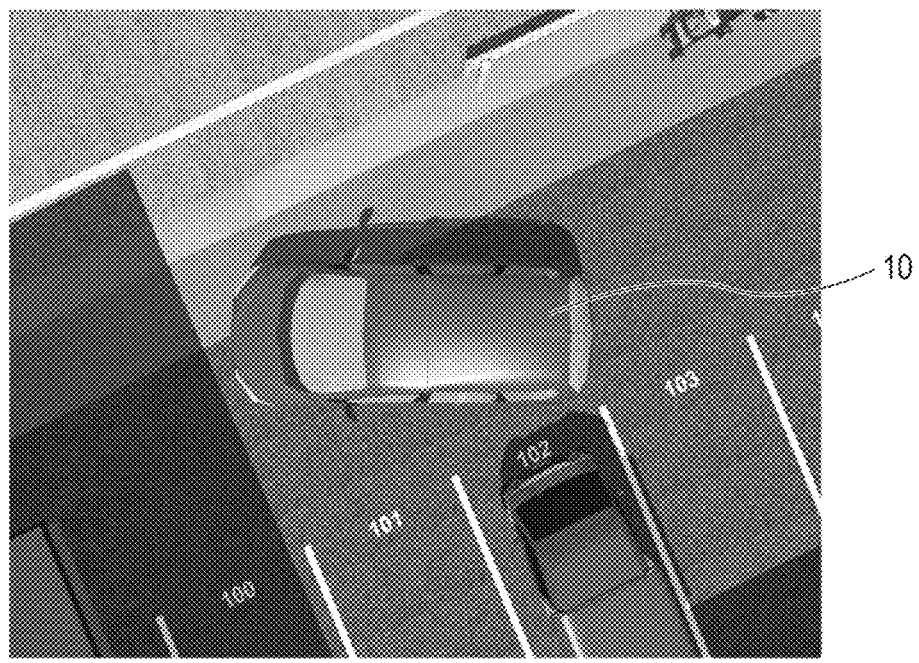
FIG. 6B is a schematic illustration of an example of a scene when an image is captured according to the embodiment.

FIG. 6A is a plan view illustrating an installation example of the compound eye camera system 10 in an automobile. The image capturing unit 100 is installed in the rear portion of the vehicle body so as to face rearward such that the optical axis of the camera 101 substantially coincides with the front-rear direction of the automobile. The image processing unit 110 and the display 120 are installed in the compartment of the automobile so as to be visible to the driver. FIG. 6B is a plan view illustrating an example of a scene when an image is captured by the compound eye camera system 10 mounted on the automobile. Although not limited to the following example, according to the present embodiment, the two cameras 101a and 101b of the image capturing unit 100 capture and output the images at predetermined time intervals in synchronization with each other.

Figure 7A:
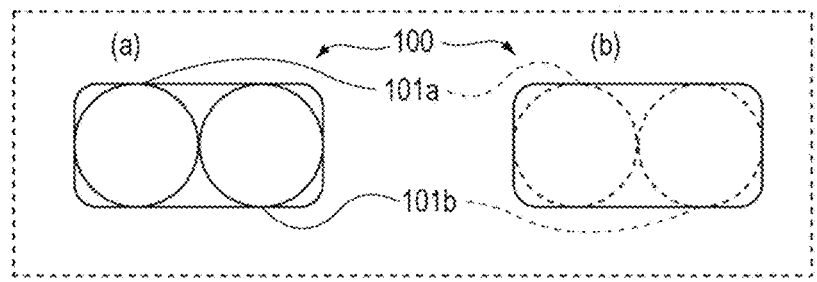
FIG. 7A is a schematic illustration of an example of the configuration of an image capturing unit according to the embodiment.
Figure 7B:
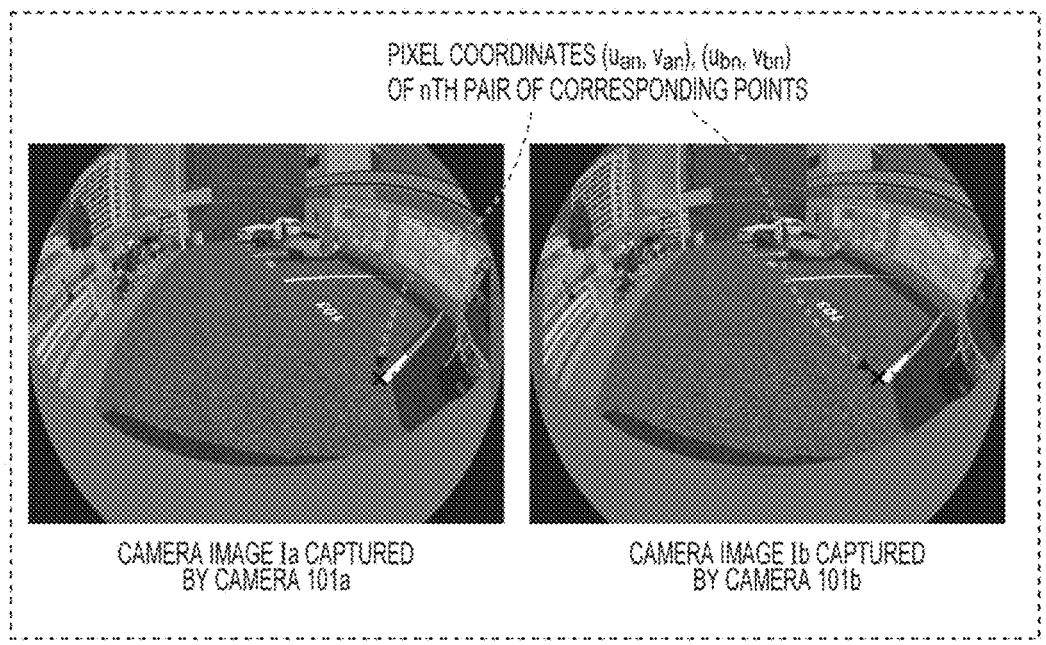
FIG. 7B is a schematic illustration of an example of a captured image according to the embodiment.

FIGS. 7A(a) and 7A(b) are a front view and a rear view, respectively, illustrating an example of the arrangement of the two cameras 101a and 101b in the image capturing unit 100. FIG. 7B illustrates examples of images captured by the two cameras 101a and 101b illustrated in FIG. 7A in the image capturing scene illustrated in FIG. 6B. The viewing angle of each of the cameras 101a and 101b is approximately 180 degrees. As can be seen from FIG. 7B, the same objects appear in almost entire field of view of each of the cameras 101a and 101b.

The computer 300 performs the processes in steps S401 to S403 in FIG. 5 by executing a predetermined program simultaneously with the operation performed by the image capturing unit 100. The processes in steps S401 to S403 performed by the computer 300 are described in detail below with reference to FIGS. 7A to 12B.

In step S401, the position calculation unit 112 reads, from the camera parameter storage unit 114, the camera parameter sets including the internal parameter sets and the external parameter sets of the cameras 101a and 101b and the occlusion information, which are stored in the camera parameter storage unit 114 in advance.

The relationship between an external parameter set M of the camera and the three-dimensional coordinate set and the relationship among an internal parameter set (f, dpx, dpy, cu, cv) of the camera, the three-dimensional coordinate set, and the pixel coordinate pair are given by the following equations (1) and (2):

$$\begin{pmatrix} x_e \\ y_e \\ z_e \\ 1 \end{pmatrix} = M \begin{pmatrix} x_w \\ y_w \\ z_w \\ 1 \end{pmatrix}, \quad M = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix} \quad (1)$$

$$\left. \begin{array}{l} u = \dfrac{1}{dpx} f \dfrac{x_e}{z_e} + cu \\ v = \dfrac{1}{dpy} f \dfrac{y_e}{z_e} + cv \end{array} \right\} \quad (2)$$

The external parameter set M in Equation (1) above is an external parameter set representing the positional relationship between the world coordinate system and the camera coordinate system. The external parameter set M is expressed by a 4×4 matrix that transforms the three-dimensional coordinate set $(x_w, y_w, z_w)$ of the world coordinate system into the three-dimensional coordinate set $(x_e, y_e, z_e)$ of the camera coordinate system. Equation (2) above expresses the relationship between the three-dimensional coordinate set $(x_e, y_e, z_e)$ of the camera coordinate system and the pixel coordinate pair (u, v). f in the internal parameter set represents the focal length of the camera, dpx and dpy represent pixel sizes in the x direction and the y direction of the imaging device of the camera, respectively, (cu, cv) represents the pixel coordinate pair of the intersection point of the $Z_e$ axis of the camera coordinate system and the imaging surface of the camera. Note that when the digital image is considered as a set of "values (that is, the pixel values) at two-dimensional grid points (that is, the pixel coordinate pairs)", the positions of the pixels of an image are represented by two-dimensional pixel coordinate pairs.

The external parameter set M and the internal parameter set (f, dpx, dpy, cu, cv) are obtained beforehand by using the above-described existing camera calibration technique. Note that to calculate dpx, dpy and f, Equations (1) and (2) above do not provide the sufficient constraint conditions. Therefore, the design value of any one of dpx, dpy, and f may be used, and the other two parameters may be calculated by using the above-described existing camera calibration technique.

While a perspective projection model (also referred to as a "pinhole camera model") is used in the above-described equation (2) as the projection model of the lens, the projection model is not limited thereto. Another projection model, such as an equidistant projection model, a stereographic projection model, or an equisolid angle projection model, may be used. For example, in the case of an equidistant projection model, instead of using the internal parameter set in Equation (2), an internal parameter set given by the following equation (3) is used:

$$\left. \begin{array}{l} u = \dfrac{1}{dpx} \dfrac{x_e}{\sqrt{x_e^2 + y_e^2}} f\theta + cu \\ v = \dfrac{1}{dpy} \dfrac{y_e}{\sqrt{x_e^2 + y_e^2}} f\theta + cv \\ \theta = \tan^{-1}\left( \dfrac{\sqrt{x_e^2 + y_e^2}}{z_e} \right) \end{array} \right\} \quad (3)$$

Note that for simplicity of description, the cameras 101a and 101b are also referred to as cameras i and j, respectively. In this case, the external parameter sets $M_i$ and $M_j$ representing the positional relationship between the cameras i and j can be given as follows:

$$\begin{pmatrix} x_j \\ y_j \\ z_j \\ 1 \end{pmatrix} = M_j M_i^{-1} \begin{pmatrix} x_i \\ y_i \\ z_i \\ 1 \end{pmatrix} = M_{i,j} \begin{pmatrix} x_i \\ y_i \\ z_i \\ 1 \end{pmatrix} \quad (4)$$

In addition, a camera parameter set that summarizes the internal parameter set and the external parameter set of the camera 101a is represented by $C_a$ as illustrated in the following Equation (5), and a camera parameter set that summarizes the internal parameter set and the external parameter set of the camera 101b is represented by $C_b$ as illustrated in the following Equation (6):

$$C_a = (f_a, dpx_a, dpy_a, cu_a, cv_a, M_a) \quad (5)$$

$$C_b = (f_b, dpx_b, dpy_b, cu_b, cv_b, M_b) \quad (6)$$

In step S402, the position calculation unit 112 acquires two camera images of the same object captured by the cameras 101a and 101b of the image capturing unit 100. Thereafter, the position calculation unit 112 calculates the three-dimensional coordinate set of the point on the object for the pair of corresponding points in the two camera images by stereopsis for binocular vision based on the two acquired camera images and the camera parameter sets of the cameras 101a and 101b read in step S401. More specifically, the position calculation unit 112 estimates and extracts a pair of points, that is, a pair of corresponding points. One of the points is included in one of the camera images of the cameras 101a and 101b and the other of the points is included in the other of the camera images of the cameras 101a and 101b and the two points correspond to each other. In addition, the position calculation unit 112 calculates three-dimensional coordinate set of a point on the object corresponding to the pair of corresponding points by using the principle of triangulation with the help of the parallax of the point on the object with respect to the two points included in the pair of corresponding points. In this manner, the three-dimensional coordinate set of the point on the object corresponding to the points included in the camera images are calculated. Note that the position calculation unit 112 extracts pairs of corresponding points and calculates the three-dimensional coordinate sets of the points on the object each corresponding to the pairs of corresponding points. Finally, the position calculation unit 112 outputs the positional information including the calculated three-dimensional coordinate sets.

The process performed by the position calculation unit 112 in step S402 is described in detail below. Let Ia and Ib be camera images captured by the cameras 101a and 101b, respectively. The position calculation unit 112 estimates and calculates the pixel coordinate pair $Q_{an}$ of the point in the camera image Ia and the pixel coordinate pair $Q_{bn}$ of the point in the camera image Ib, both of which correspond to a point Pn on the object, on the basis of, for example, the similarity between the images, the luminance constraint (described below), and the smoothness constraint. That is, a pair of corresponding pixel coordinate pairs ($Q_{an}$, $Q_{bn}$) is calculated. The pair of pixel coordinate pairs ($Q_{an}$, $Q_{bn}$) is a pair of the coordinate pairs of pixels that are included in the two camera images, respectively, and that correspond to each other. Note that when a point included in the camera image Ia and a point included in the camera image Ib correspond to each other, the pair of corresponding points may be defined as a pair of the pixel coordinate pair of the point included in the camera image Ia and the pixel coordinate pair of the point included in the camera image Ib.

For example, the position calculation unit 112 obtains the pixel coordinate pair ($u_{an}$, $v_{an}$) of the nth pixel among the pixels included in the camera image Ia. In addition, the position calculation unit 112 estimates the corresponding point in the camera image Ib and calculates a pixel coordinate pair ($u_{bn}$, $v_{bn}$) of the corresponding point. The image of an object in the camera image Ia is represented at the pixel coordinate pair (uan, van) and the image of the object in the camera image Ib is represented at the pixel coordinate pair (ubn, vbn).

When two cameras take pictures of the same object and obtains two camera images, that is, images of the same point on the object are included in one camera image and the other camera image, and the one of the images of the same point is shown at a point in the one camera image and the other of the images of the same point is shown at a point in the other camera image, a pair of the points in the two camera images is referred to as a "pair of corresponding points in two camera images". According to the present embodiment, a pair of corresponding points is expressed by using a pair of pixel coordinate pairs. For example, when the pair of camera images is the images Ia and Ib, the pixel coordinate pair ($u_{bn}$, $v_{bn}$) in the camera image Ib, which correspond to the pixel coordinate pair ($u_{an}$, $v_{an}$) in the camera image Ia, are calculated. The calculation of a pair of pixel coordinate pairs is performed for all the pixels included in the camera image Ia.

When the pixel coordinate pair ($u_{an}$, $v_{an}$) in the camera image Ia and the pixel coordinate pair ($u_{bn}$, $v_{bn}$) in the camera image Ib are the pixel coordinate pairs of two corresponding points included in the pair of corresponding points, a pixel value Ia($u_{an}$, $v_{an}$) and a pixel value Ib($u_{bn}$, $v_{bn}$) at the two pixel coordinate pairs are the same. This constraint condition is called luminance constraint. In addition, since one given object occupies adjacent pixels in a camera image, it is highly likely that a point included in the camera image Ib that corresponds to a point identified by the pixel adjacent to the pixel coordinate pair ($u_{an}$, $v_{an}$) of the camera image Ia is located close to a point identified by the pixel coordinate pair ($u_{bn}$, $v_{bn}$) of the camera image Ib. This constraint condition is called smoothness constraint. The pair of corresponding points in the camera images Ia and Ib can be obtained by estimating a set of pairs including the pixel coordinate pair ($u_{an}$, $v_{an}$) and the pixel coordinate pair ($u_{bn}$, $v_{bn}$) that best satisfy the two conditions described above, that is, the luminance constraint and smoothness constraint.

A corresponding point search method or a motion estimation method for estimating the pair of pixel coordinate pairs of a pair of corresponding points with real number precision is described in detail in, for example, NPL 2 mentioned above. Since the methods are well-known, a detailed description is not given here.

Subsequently, for each of the pairs of corresponding points, the position calculation unit 112 calculates a three dimensional coordinate set ($x_{an}$, $y_{an}$, $z_{an}$) of a point on the object corresponding to the pair of corresponding points by simultaneously solving Equations (1) and (2) for the two cameras 101a and 101b with the pair of pixel coordinate pairs [($u_{an}$, $v_{an}$), ($u_{bn}$, $v_{bn}$)] of the pair of corresponding points in the camera images Ia and Ib, a prepared camera parameter set $C_a$ of the camera 101a, and a prepared camera parameter set $C_b$ of the camera 101b. In this example, the three-dimensional coordinates are the coordinate values of the camera coordinate system of the camera 101a.

Note that the binocular stereo method for calculating the three-dimensional coordinate set of a point on an object corresponding to a pair of corresponding points by using the pair of corresponding points and the camera parameter sets of two cameras is not limited to the above-described technique. A technique other than the above-described method can be used. One of other binocular stereo methods is described in detail in aforementioned NPL 3. Since the technique is well-known, a detailed description of the technique is not given here.

For simplicity of description, let T be a function used in the following Equation (7), and let F be a function used in the following Equation (8):

$$(u_{an}, v_{an}, u_{bn}, v_{bn}) = T(I_a, I_b) \tag{7}$$

$$(x_{an}, y_{an}, z_{an}) = F(u_{an}, v_{an}, u_{bn}, v_{bn}, C_a, C_b) \tag{8}$$

The function T is a process to calculate the pixel coordinate pair ($u_{an}$, $v_{an}$) and the pixel coordinate pair ($u_{bn}$, $v_{bn}$) of the corresponding points in a pair from the camera images Ia and Ib. The function F is a process to calculate the three-dimensional coordinate set of a point on an object corresponding to the pair of corresponding points by using the pixel coordinate pairs $(u_{an}, v_{an})$ and $(u_{bn}, v_{bn})$ of the corresponding points in the pair and the camera parameter sets $C_a$ and $C_b$ of the cameras 101a and 101b and by using Equations (1) and (2).

Let $p_{a,b,n}$ denote nth positional information that collectively describes the pair of pixel coordinate pairs of the pair of nth corresponding points in the camera images Ia and Ib and the three-dimensional coordinate set of the point on the object corresponding to the pair of corresponding points, and let $P_{a,b}$ denote a set of N pieces of positional information $p_{a,b,n}$. Then, $P_{a,b}$ is given as follows:

$$P_{a,b} = \{p_{a,b,n}\}, (n = 1 \ldots N) \qquad (9)$$
$$= \{(u_{an}, v_{an}, u_{bn}, v_{bn}, x_{an}, y_{an}, z_{an})\}$$

The positional information $p_{a,b,n}$ includes the pixel coordinate pair $(u_{an}, v_{an})$ of the corresponding point included in the camera image Ia, the pixel coordinate pair $(u_{bn}, v_{bn})$ of the corresponding point included in the camera image Ib, and the three-dimensional coordinate set $(x_{an}, y_{an}, z_{an})$ corresponding to the pair of corresponding points.

Figure 8A:
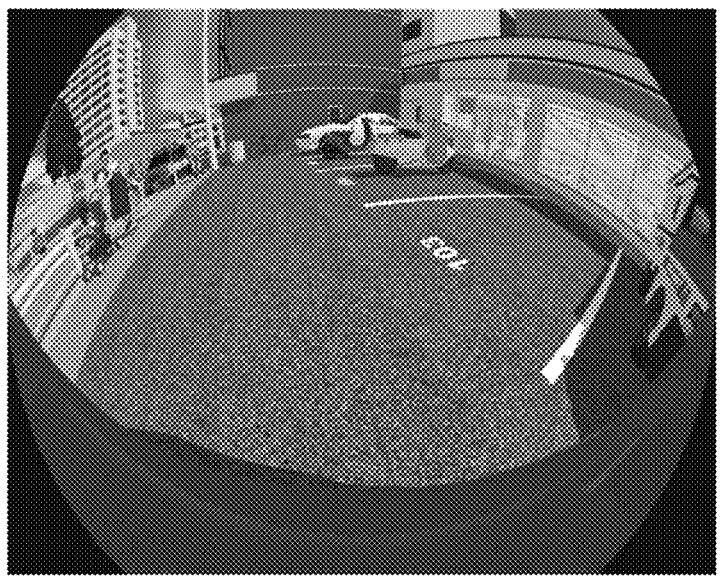
FIG. 8A is a schematic illustration of an example of an image according to the embodiment.
Figure 8B:
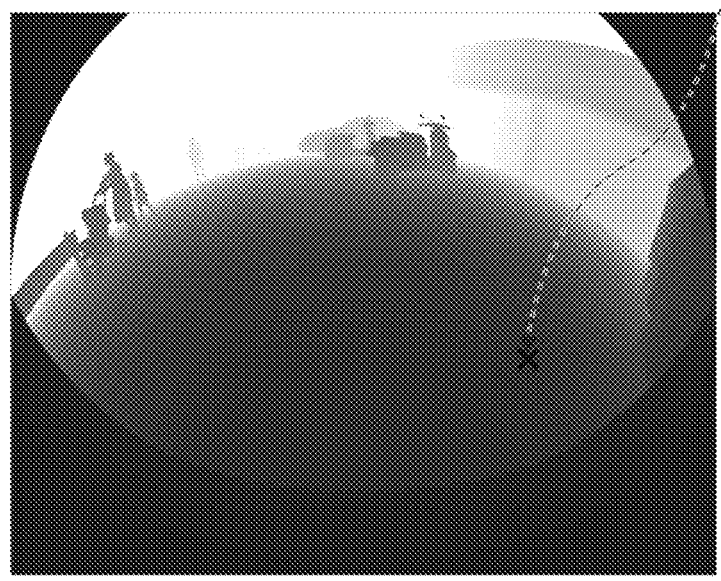
FIG. 8B is a schematic illustration of an example of positional information according to the embodiment.

As described above, the position calculation unit 112 calculates pairs of corresponding points, calculates the three-dimensional coordinate sets of points on an object corresponding to the pairs of corresponding points, and outputs the positional information $P_{a,b}$ including pairs each including pixel coordinate pairs of the pair of corresponding points and the three-dimensional coordinate set of the point on the object corresponding to the pair of corresponding points. In this manner, for example, as illustrated in FIGS. 8A and 8B, a distance image can be obtained in which a distance from the camera is represented in the form of a grayscale image. Note that FIG. 8A illustrates an example of a camera image, and FIG. 8B illustrates an example of a distance image of the camera image. In the distance image, the distance from the camera to a target point is represented by the luminance of the pixel.

Figure 9:
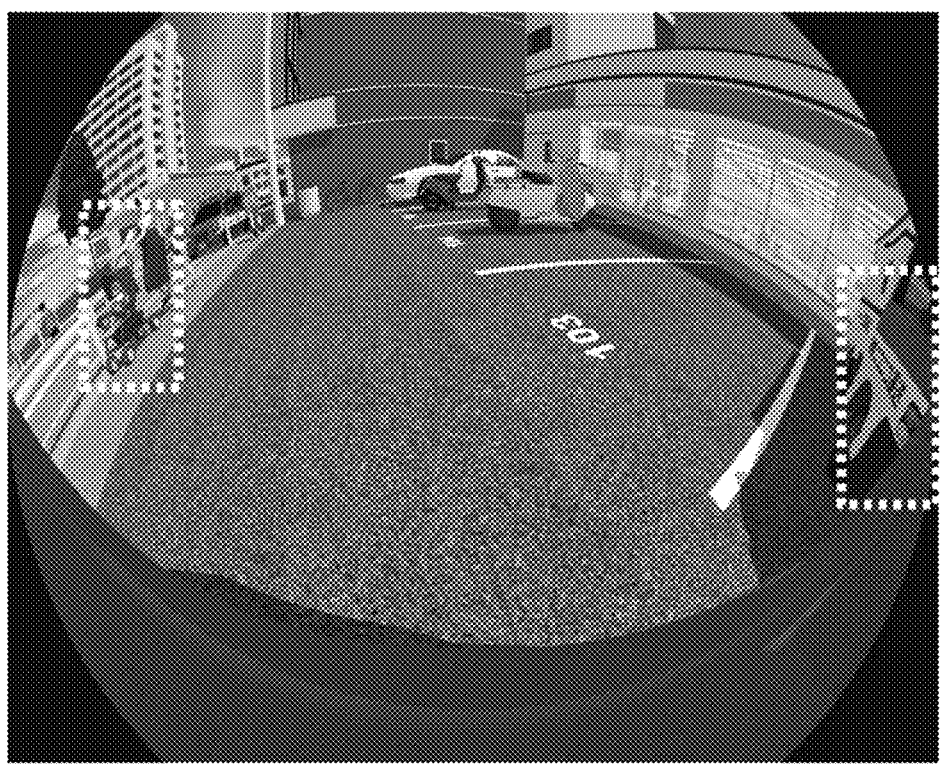
FIG. 9 is a schematic illustration of an example of a composite image output from an image generation unit according to the embodiment.

Finally, in step S403, the image generation unit 113 obtains a camera image (for example, a camera image Ia), which is one of the camera images Ia and Ib, and the positional information $\{P_{a,b}\}$ including pairs each including pixel coordinate pairs of the pair of corresponding points and the three-dimensional coordinate set of the point on the object corresponding to the pair of corresponding points. In addition, the image generation unit 113 detects a three-dimensional object, such as an obstacle represented by corresponding points in the camera image Ia. Thereafter, for example, as illustrated in FIG. 9, the image generation unit 113 superimposes a frame indicating an area of interest over the camera image at a position corresponding to the position of the detected three-dimensional object and outputs the composite image. FIG. 9 is a schematic illustration of an example of the composite image output from the image generation unit 113 according to the embodiment.

According to the present embodiment, to detect a three-dimensional object, such as an obstacle, from the positional information by using the image generation unit 113, points each having a distance from the camera 101 less than a predetermined distance dth and having a height higher than the ground are extracted from among the three-dimensional coordinate sets included in the positional information. The extracted points are considered as the three-dimensional object. More specifically, by using the three-dimensional coordinate set $(x_{an}, y_{an}, z_{an})$ included in the nth positional information $p_{a,b,n}$ in the position set $P_{a,b}$, the image generation unit 113 calculates a distance $d_n$ between the three-dimensional coordinate set $(x_{an}, y_{an}, z_{an})$ and the camera 101a and the three-dimensional coordinate set $(x_{wn}, y_{wn}, z_{wn})$ of the world coordinate system corresponding to the three-dimensional coordinate set $(x_{an}, y_{an}, z_{an})$. Thereafter, if the distance $d_n$ is smaller than the predetermined distance dth ($d_n <$ dth) and the height of the three-dimensional coordinate set of the world coordinate system is higher than the ground ($z_{wn} > 0$), the image generation unit 113 extracts, as a point on the three-dimensional object, the point located in the three-dimensional space and identified by the three-dimensional coordinate set $(x_{an}, y_{an}, z_{an})$ included in the nth positional information $p_{a,b,n}$. In addition, the image generation unit 113 extracts a set of projection points obtained by projecting, over the camera image Ia, three-dimensional coordinate values included in pieces of positional information detected as points on a three-dimensional object. Thereafter, the image generation unit 113 superimposes a frame, such as a rectangular frame, that circumscribes the set of projection points over the camera image Ia to generate a composite image. Subsequently, the image generation unit 113 outputs the composite image to display the composite image on the display 120.

As described above, the image processing unit 110 generates the image of the three-dimensional object and the positional information regarding the three-dimensional object from the two camera images captured by the image capturing unit 100 through the processing in steps S401 to S403 performed by the computer 300 and outputs the generated image and positional information. In addition, the image capturing unit 100 and the computer 300 may repeat the above-described processing.

FIG. 9 illustrates an example of a composite image generated through the process in step S403. For example, in the example illustrated in FIG. 9, a frame is displayed around each of obstacles (a pedestrian and a parked vehicle) located close to the camera mounted in the rear portion of the vehicle body in order to draw driver's attention to the obstacles. Accordingly, a driver can easily notice the obstacles which are likely to collide with the vehicle. In addition, since in particular, the compound eye camera system 10 includes the cameras each using a fisheye lens, the compound eye camera system 10 can obtain a camera image of 180 degrees and the three-dimensional coordinate sets corresponding to the camera image.

As described above, the image capturing unit 100 of the compound eye camera system 10 and the image processing unit 110 configured by the computer 300 operate to calculate the three-dimensional coordinate sets of points on the object corresponding to points included in the camera image by using the camera images captured by two cameras. In addition, the image processing unit 110 can detect a three-dimensional object in the field of view of the camera (e.g., an obstacle) on the basis of a pair including pixel coordinate pairs of a pair of corresponding points and the three-dimensional coordinate set of a point on the object corresponding to the pair of corresponding points. Thereafter, the image processing unit 110 can display the three-dimensional object. As a result, the driver of the automobile including the compound eye camera system 10 can easily notice the three-dimensional object, such as an obstacle located in the vicinity of the automobile.

2-2. Self-Calibration Operation

Figure 10:
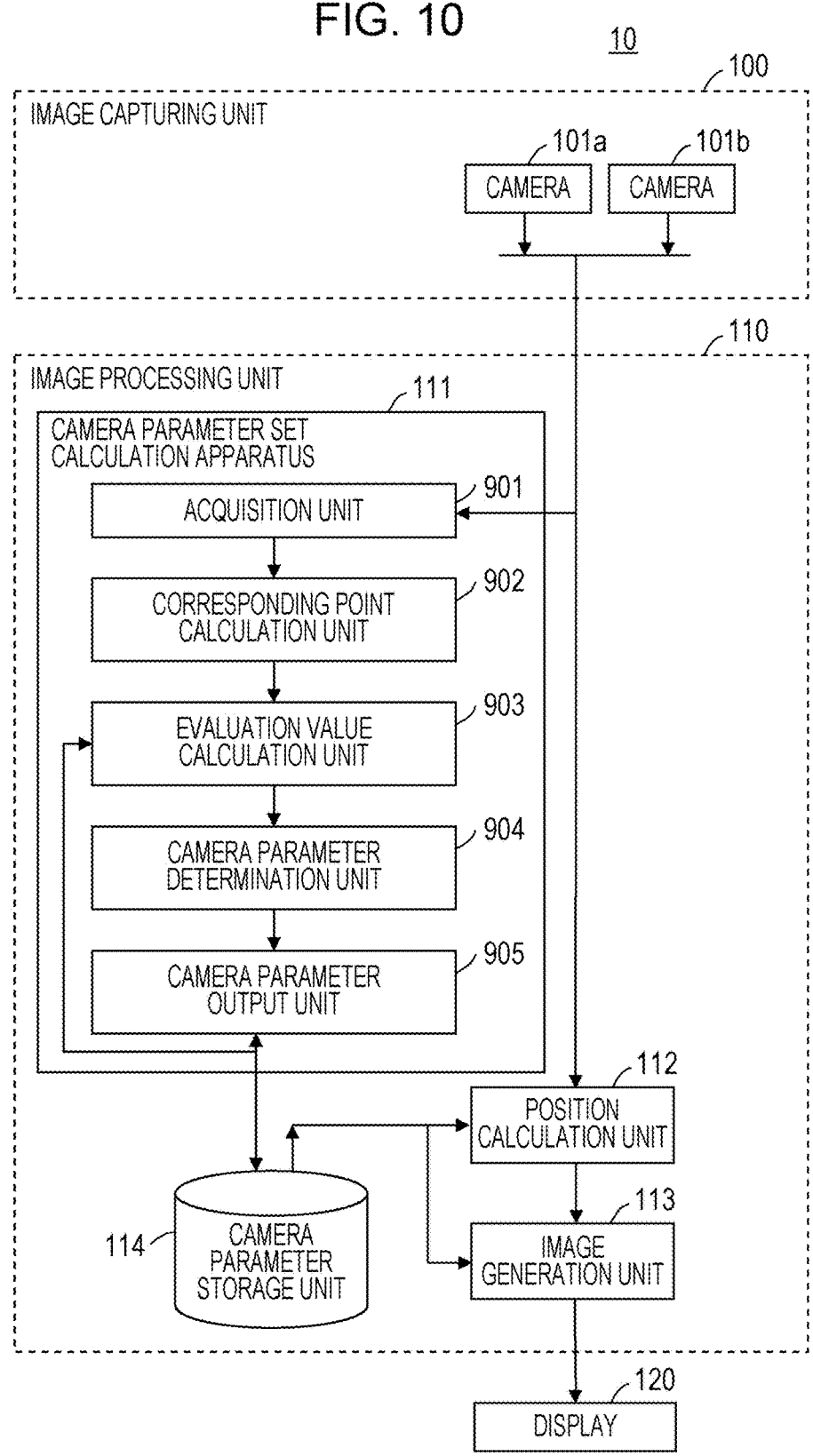
FIG. 10 is a schematic illustration of the detailed functional configuration of a camera parameter set calculation apparatus according to the embodiment.
Figure 11:
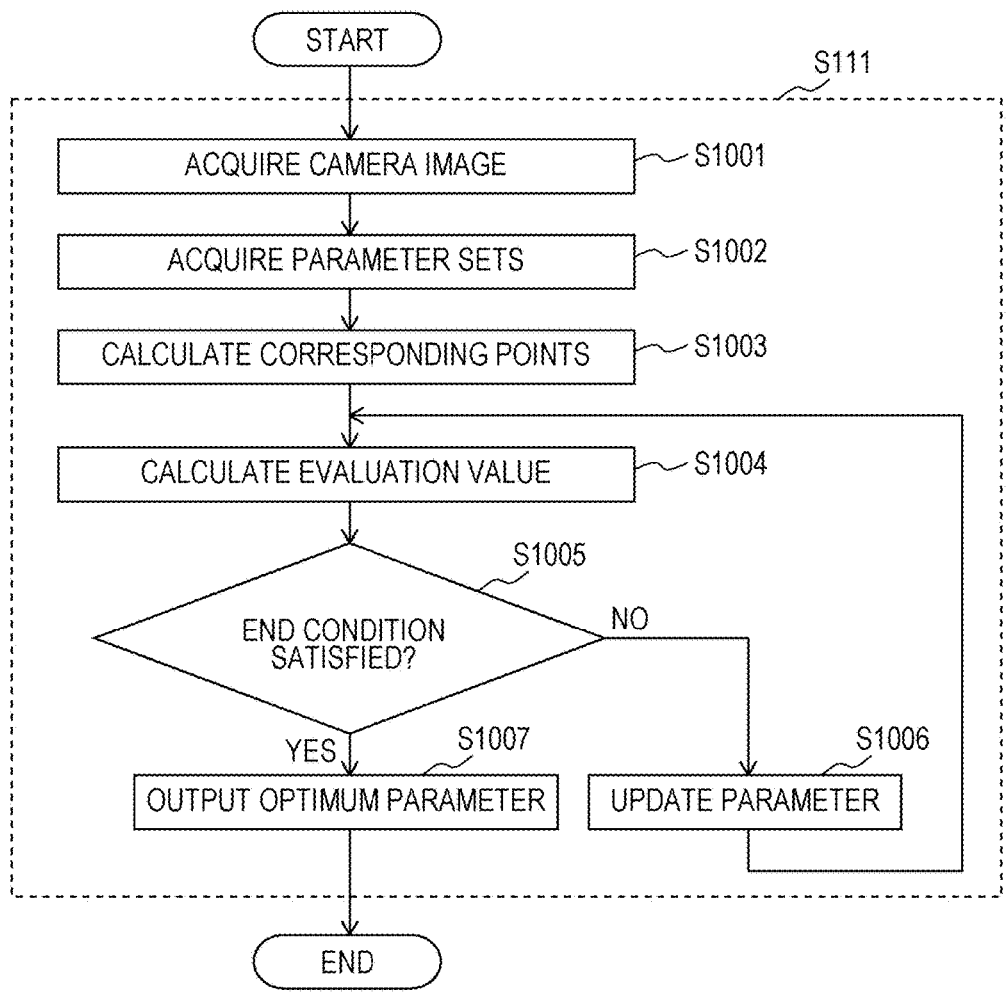
FIG. 11 is a flowchart illustrating an example of the flow of the operation performed by the image processing unit during self-calibration according to the embodiment.

The compound eye camera system 10 described above calculates the three-dimensional coordinate sets of the object by using the camera parameter set recorded in advance. The camera parameter set may vary due to deformation caused by aged deterioration, an external force, or a temperature change. In such a case, calibration of the camera is needed. The operation performed by the compound eye camera system 10 during self-calibration is described below with reference to FIGS. 10 and 11. FIG. 10 is a functional configuration diagram illustrating the detailed configuration of the camera parameter set calculation apparatus 111 of the compound eye camera system 10 illustrated in FIG. 2. FIG. 11 is a flowchart illustrating an example of self-calibration process S111 performed by the image processing unit 110 of the compound eye camera system 10 according to the embodiment.

As illustrated in FIG. 10, the camera parameter set calculation apparatus 111 that performs self-calibration process S111 includes an acquisition unit 901, a corresponding point calculation unit 902, an evaluation value calculation unit 903, a camera parameter determination unit 904, and a camera parameter output unit 905. The constituent elements constituted by the acquisition unit 901, the corresponding point calculation unit 902, the evaluation value calculation unit 903, the camera parameter determination unit 904, and the camera parameter output unit 905 may have the same configuration as the constituent elements of the image processing unit 110.

The acquisition unit 901 acquires, from the image capturing unit 100, the camera images Ia and Ib captured by the cameras 101a and 101b, respectively. The acquisition unit 901 may acquire the camera images Ia and Ib stored in a storage device (not illustrated) of the image capturing unit 100 or the image processing unit 110. An example of the storage device is a memory. Each of the camera images Ia and Ib includes the same object used as a reference for calibration. In addition, the acquisition unit 901 acquires, from the camera parameter storage unit 114, an initial camera parameter set including the camera parameters currently set in the cameras 101a and 101b.

The corresponding point calculation unit 902 extracts, from the camera images Ia and Ib, pairs of points that correspond to each other, that is, pairs of corresponding points and calculates the pixel coordinate pair of the corresponding point in each of the camera images Ia and Ib.

The evaluation value calculation unit 903 calculates the three-dimensional coordinate set of a point on the object corresponding to one of the pairs of corresponding points by using the above-described stereoscopic range finding technique based on the pixel coordinate pairs of the corresponding points and the initial camera parameter set. Hereinafter, a point on the object corresponding to a pair of corresponding points is also referred to as a "ranging point".

In addition, the evaluation value calculation unit 903 calculates the evaluation value of the camera parameter set on the basis of the pixel values of the points obtained by projecting the three-dimensional coordinate set of the ranging point onto the camera images Ia and Ib. Hereinafter, the points on the two camera images obtained by projecting the three-dimensional coordinate set of the ranging point onto the two camera images are referred to as "projection points". The projection point obtained by projecting, onto the camera image Ia, the ranging point obtained on the basis of the camera image Ia captured by the camera 101a and the camera image Ib captured by the camera 101b may be referred to as a "first projection point", and the projection point obtained by projecting the same ranging point onto the camera image Ib may be referred to as a "second projection point".

The camera parameter determination unit 904 determines whether to change the camera parameter sets currently set in the cameras 101a and 101b on the basis of the evaluation values calculated by the evaluation value calculation unit 903. The camera parameter determination unit 904 changes, that is, updates the camera parameter set based on the result of determination. In this way, the camera parameter determination unit 904 determines the camera parameter set. The camera parameter output unit 905 acquires the camera parameter sets determined by the camera parameter determination unit 904 and outputs the camera parameter sets to the camera parameter storage unit 114 or the like.

As illustrated in FIG. 11, the camera parameter set calculation apparatus 111 performs self-calibration process S111 including the processes in steps S1001 to S1007 so as to calibrate the camera parameter sets, that is, the initial camera parameter sets set for the cameras 101a and 101b. In self-calibration process S111, the camera parameter set calculation apparatus 111 automatically performs the calibration process. If a calibration instruction is input to the compound eye camera system 10 by the user via an input device (not illustrated) such as a switch, a touch pad, or a keyboard, the camera parameter set calculation apparatus 111 starts the self-calibration process for the cameras 101a and 101b. For example, if the user detects the abnormality of the camera 101a or 101b, the user may input a calibration instruction. Alternatively, a calibration instruction may be input before factory shipment after completion of manufacture of the cameras 101a and 101b. Still alternatively, the camera parameter set calculation apparatus 111 may automatically start the self-calibration process at a predetermined point in time.

After self-calibration process S111 performed by the camera parameter set calculation apparatus 111 is started, the acquisition unit 901 acquires the camera images Ia and Ib captured by the cameras 101a and 101b, respectively, in step S1001. In addition, in step S1002, the acquisition unit 901 reads the initial camera parameter sets Ca0 and Cb0 of the cameras 101a and 101b stored beforehand in the camera parameter storage unit 114. As used herein, the term "beforehand" may be referred to as "before the camera parameter set calculation apparatus 111 starts the self-calibration process".

In step S1003, the corresponding point calculation unit 902 uses the acquired camera images Ia and Ib output from the cameras 101a and 101b, respectively, and estimates pairs of corresponding points in the camera images Ia and Ib by using the corresponding point search technique that is the same as that in step S402 illustrated in FIG. 5. In addition, the corresponding point calculation unit 902 calculates and outputs the pixel coordinate pair $(u_{an}, v_{an})$ of the corresponding point included in the camera image Ia and the pixel coordinate pair $(u_{bn}, v_{bn})$ of corresponding point included in the camera image Ib. Note that n is a value in the range of 1 to N, and the nth pair of corresponding points includes a corresponding point Pan and a corresponding point Pbn.

Note that steps S1004 to S1006 are repeated in accordance with the result of determination made in step S1005. The camera parameter set of each of the cameras 101a and 101b is updated each time the steps S1004 to S1006 are repeated. Accordingly, let $C_{ar}$ and $C_{br}$ denote the camera parameter sets of the cameras 101a and 101b at the rth iteration, respectively. Then, for the initial camera parameter set, r=0.

In step S1004, by using the pixel coordinate pairs of the corresponding points included in the N pairs of corresponding points and the camera parameter sets $C_{ar}$ and $C_{br}$ of the cameras 101a and 101b, the evaluation value calculation unit 903 calculates and outputs three-dimensional coordinate sets $(x_{ar1}, y_{ar1}, z_{ar1}) \ldots (x_{arn}, y_{arn}, z_{arn})$ of points corresponding to the N pairs of corresponding points by using the following equation based on the stereoscopic range finding technique:

$$(x_{arn}, y_{arn}, z_{arn}) = F(u_{an}, v_{an}, u_{bn}, v_{bn}, C_{ar}, C_{br}) \; r=0 \ldots R, \; n=1 \ldots N \quad (10)$$

That is, the evaluation value calculation unit 903 calculates the three-dimensional coordinate sets of the N ranging points.

In addition, the evaluation value calculation unit 903 projects each of the ranging points onto the camera images Ia and Ib output from the cameras 101a and 101b, respectively, by using the three-dimensional coordinate sets of the N ranging points and the camera parameter sets $C_{ar}$ and $C_{br}$ of the cameras 101a and 101b, respectively. Thereafter, for each of the ranging points, the evaluation value calculation unit 903 calculates the first projection point obtained by projecting the ranging point onto the camera image Ia and the second projection point obtained by projecting the ranging point onto the camera image Ib. Projecting the ranging point onto a camera image means transforming the three-dimensional coordinate set of each of the ranging points into the pixel coordinate pair in the camera image Ia and the pixel coordinate pair in the camera image Ib by the evaluation value calculation unit 903 using the following equations:

$$(u_{arn}, v_{arn}) = G(x_{arn}, y_{arn}, z_{arn}, C_{ar}) \; r=0 \ldots R, \; n=1 \ldots N \quad (11)$$

$$(u_{brn}, v_{brn}) = H(x_{arn}, y_{arn}, z_{arn}, C_{ar}, C_{br}) \; r=0 \ldots R, \; n=1 \ldots N \quad (12)$$

Thus, for each of the ranging points, the evaluation value calculation unit 903 calculates the pixel coordinate pair $(u_{arn}, v_{arn})$ in the camera image Ia and the pixel coordinate pair $(u_{brn}, v_{brn})$ in the camera image Ib for the first projection point and the second projection point. Function G in Equation (11) represents the coordinate transformation from the three-dimensional coordinate set of a ranging point into the pixel coordinate pair in the camera image Ia on the basis of the above-described Equations (1), (2), and (4). Function H in Equation (12) represents the coordinate transformation from the three-dimensional coordinate set of the ranging point into the pixel coordinate pair in the camera image Ib on the basis of the above-described Equations (1), (2), and (4).

Furthermore, the evaluation value calculation unit 903 calculates the pixel value iar of the first projection point obtained by projecting the ranging point onto the camera image Ia and the pixel value ibr of the second projection point obtained by projecting the same ranging point onto the camera image Ib by using the camera images Ia and Ib and the camera parameter sets $C_{ar}$ and $C_{br}$. For example, let $(u_{arn}, v_{arn})$ denote the pixel coordinate pair of the first projection point, and let $(u_{brn}, v_{brn})$ denote the pixel coordinate pair of the second projection point. Then, the pixel value iar of the first projection point is expressed by $I_a(u_{arn}, v_{arn})$, and the pixel value ibr of the second projection point is expressed as $I_b(u_{brn}, v_{brn})$. Note that the evaluation value calculation unit 903 calculates the pixel value of the first projection point and the pixel value of the second projection point for each of the ranging points. Thereafter, the evaluation value calculation unit 903 calculates an evaluation value J defined by the sum of the absolute values of the differences The evaluation value J is expressed in the following evaluation function:

$$J = \frac{1}{N} \sum_{n=1}^{N} |I_a(u_{am}, v_{bm}) - I_b(u_{bm}, v_{bm})| \quad (13)$$

where N is the number of the ranging points. Each of the differences is provided as a difference between the pixel value iar of the first projection point and the pixel value ibr of the second projection point.

In addition, according to the present embodiment, the pixel value is the luminance value of a pixel. The pixel coordinate pair has a real number precision. The pixel value at the pixel coordinate pair is calculated by bicubic interpolation. Note that the pixel value is not limited to the luminance value, and the RGB value may be used as the pixel value, instead of the luminance value. Furthermore, the method for calculating the pixel value for the pixel coordinate pair having real number precision is not limited to bicubic interpolation, and another interpolation method, such as bilinear interpolation, may be used. In addition, when calculating the sum of the absolute values of the differences between the pixel value of the first projection point and the pixel value of the second projection point corresponding to each of the N ranging points used in the calculation of the evaluation value J, the absolute value of the difference between the pixel values may be weighted. For example, the weight of a point group in which the color of the object continuously varies may be increased, or the weight of a point group in which the irregularity of the surface of the object is large may be reduced. These weightings are effective for smoothing a change in evaluation value J with respect to a continuous change of the camera parameters and, thus, facilitating to minimize the evaluation value J.

Subsequently, in step S1005, the camera parameter determination unit 904 determines whether a condition for ending the updating of the camera parameter sets $C_{ar}$ and $C_{br}$ of the cameras 101a and 101b, respectively, is satisfied. If the ending condition is not satisfied (NO in step S1005), the processing performed by the camera parameter determination unit 904 proceeds to step S1006, where the camera parameter sets $C_{ar}$ and $C_{br}$ are changed. However, if the ending condition is satisfied (YES in step S1005), the camera parameter determination unit 904 ends the updating of the camera parameter set. Thereafter, the camera parameter determination unit 904 determines the updated (the most recent) camera parameter sets $C_{ar}$ and $C_{br}$ as the camera parameter sets of the cameras 101a and 101b, respectively, and outputs the camera parameter sets. Thereafter, the processing proceeds to step S1007. Note that the ending condition is at least one of the following three conditions: (a) searching of a camera parameter within a given search range has been completed; (b) the evaluation value J is less than a first threshold value; and (c) the loop count r of the processing in steps S1004 to S1006 is greater than a second threshold value.

In step S1006, the camera parameter determination unit 904 changes (that is, updates) the (r+1)th camera parameter set. More specifically, the camera parameter determination unit 904 changes the camera parameter sets $C_{ar}$ and $C_{br}$ of the cameras 101a and 101b within a given range and calculates new camera parameter sets $C_{ar+1}$ and $C_{br+1}$. The camera parameter determination unit 904 outputs the camera parameter sets $C_{ar+1}$ and $C_{br+1}$. Thereafter, the processing proceeds to step S1004. As a result, the (r+1)th process of a series of iterative processes (steps S1004 to S1006) is performed. Note that the search range of each of the camera parameters may be a predetermined range of the camera parameter. For example, the search range of each of the camera parameter may be a range of ±5% of the initial camera parameter.

In step S1007, the camera parameter output unit 905 acquires pairs including the camera parameter set calculated through the above-described iterative processing of step S1004 to step S1006 and the evaluation value J corresponding to the camera parameter set. The evaluation value J corresponding to the camera parameter set is an evaluation value calculated using the camera parameter set. The camera parameter output unit 905 selects, from among the pairs including a camera parameter set and an evaluation value J, the one having the smallest evaluation value J. In addition, if the evaluation value J corresponding to the selected camera parameter set is smaller than the evaluation value J corresponding to the initial camera parameter set, the camera parameter output unit 905 replaces the initial camera parameter set stored in the camera parameter storage unit 114 with the selected camera parameter set. In this way, the camera parameter set is updated to the optimum camera parameter set. Furthermore, the above-described operations in steps S1002 to S1007 can be expressed by the following equations:

$$\left.\begin{array}{l}\arg\min\limits_{C_{ar},C_{br}}(J) = \mathrm{argmin}\limits_{C_{ar},C_{br}}\dfrac{1}{N}\sum\limits_{n=1}^{N}|I_a(u_{arn},v_{brn}) - I_b(u_{brn},v_{brn})| \\ (u_{arn},v_{arn}) = G(x_{arn},y_{arn},z_{arn},C_{ar})\ r = 0\ ...\ R, n = 1\ ...\ N \\ (u_{brn},v_{brn}) = H(x_{arn},y_{arn},z_{arn},C_{ar},C_{br})\ r = 0\ ...\ R, n = 1\ ...\ N \\ (x_{arn},y_{arn},z_{arn}) = F(u_{an},v_{an},u_{bn},v_{bn},C_{ar},C_{br}) \\ (u_{an},v_{an},u_{bn},v_{bn}) = T(I_a,I_b)\end{array}\right\} \quad (14)$$

Note that the processes in steps S1001 to S1007 may be performed by the computer 300 illustrated in FIG. 4.

As described above, the camera parameter set calculation apparatus 111 calculates, from the camera images output from the cameras 101a and 101b, the three-dimensional coordinate set of a ranging point corresponding to each of pairs of corresponding points through self-calibration process S111 based on the stereoscopic range finding technique. In addition, the camera parameter set calculation apparatus 111 calculates the pixel coordinate pair of the first projection point obtained by projecting the ranging point onto the camera image Ia and the pixel coordinate pair of the second projection point obtained by projecting the same ranging point onto the camera image Ib. Thereafter, the camera parameter set calculation apparatus 111 calculates the evaluation value on the basis of the difference between the pixel value of the first projection point and the pixel value of the second projection point. By calculating the camera parameter sets $C_{ar}$ and $C_{br}$ of the cameras 101a and 101b that minimize the evaluation value, the camera parameter set calculation apparatus 111 can obtain camera parameter sets with the correct solution values or with small errors from the correct solution values.

2-3. Verification of Effect of Self-Calibration

Hereinafter, from the results of experiments based on simulation, it is verified that the above-described self-calibration process S111 performed by the camera parameter set calculation apparatus 111 can accurately calculate the camera parameters of the cameras 101a and 101b. The verification is described below.

To calculate the camera parameters having a reduced error from the correct solution values of the camera parameters by using the evaluation function for the evaluation value J defined by Equation (13), the evaluation function defined by Equation (13) needs to satisfy the following two conditions:
(i) The evaluation value J is minimized when the camera parameter is the correct solution value.
(ii) The evaluation function forms a linear shape that is convex downward near the correct solution value of the camera parameter.

The results of experiments described below indicate that the evaluation function defined by Equation (13) satisfies the above-described two conditions (i) and (ii). The experiments were carried out by using the camera images illustrated in FIGS. 12A and 12B as input camera images captured by the cameras 101a and 101b.

Experimental Condition 1

Under Experimental Condition 1, an experiment was conducted in which the evaluation value was calculated while changing one of the camera parameters of the cameras and, thereafter, the result of calculation of the evaluation value was compared with the known correct solution value of the camera parameter. The internal parameter set in each of the camera parameter sets of the cameras 101a and 101b includes the following five parameters in accordance with the equidistant projection model defined by the above-described equation (3): the pixel coordinate pair (cu, cv) of the center of the optical axis of the camera, the focal length f of the camera, and the lengths dpx and dpy in the x and y directions of one pixel of the image device of the camera. The external parameter set M is given by the following Equation (15) which is similar to Equation (1) described above:

$$\left.\begin{array}{l}\begin{pmatrix}x_e\\y_e\\z_e\\1\end{pmatrix} = M\begin{pmatrix}x_w\\y_w\\z_w\\1\end{pmatrix} \\ \\ M = \begin{pmatrix}r_{00} & r_{01} & r_{02} & t_X\\r_{10} & r_{11} & r_{12} & t_Y\\r_{20} & r_{21} & r_{22} & t_Z\\0 & 0 & 0 & 1\end{pmatrix} \\ \\ = \begin{pmatrix}1 & 0 & 0 & T_X\\0 & 1 & 0 & T_Y\\0 & 0 & 1 & T_Z\\0 & 0 & 0 & 1\end{pmatrix}\begin{pmatrix}\cos R_Z & -\sin R_Z & 0 & 0\\\sin R_Z & \cos R_Z & 0 & 0\\0 & 0 & 1 & 0\\0 & 0 & 0 & 1\end{pmatrix} \\ \begin{pmatrix}\cos R_Y & 0 & \sin R_Y & 0\\0 & 1 & 0 & 0\\-\sin R_Y & 0 & \cos R_Y & 0\\0 & 0 & 0 & 1\end{pmatrix}\begin{pmatrix}1 & 0 & 0 & 0\\0 & \cos R_X & -\sin R_X & 0\\0 & \sin R_X & \cos R_X & 0\\0 & 0 & 0 & 1\end{pmatrix}\end{array}\right\} \quad (15)$$

The external parameter set M includes, as particular amounts of displacement of the camera coordinate system with respect to the world coordinate system, the following six parameters: the amounts of rotation $R_X$, $R_Y$, and $R_Z$ about the X, Y, and Z axes, respectively, and the amounts of translation $T_X$, $T_Y$ and $T_Z$ of X, Y, and Z in the X-, Y-, and Z-axis directions, respectively. The camera parameter sets of the two cameras 101a and 101b include 22 parameters in total. Note that the X, Y and Z axes are the reference axes of the world coordinate system.

Since dpx and f, and dpy and f cannot be uniquely obtained due to the scale uncertainty, dpy is set to the design value (a constant value). In addition, when camera images output from two cameras mounted as illustrated in FIG. 7A are used, the amount of translation $T_X$ in the baseline length direction (for example, the X-axis direction) in the camera parameters of the two cameras cannot be uniquely obtained due to the scale uncertainty. Thus, $T_X$ is set to be the design value (a constant value). As a result, the evaluation value J is a function having the following nine camera parameters as variables for each of the cameras: cu, cv, f, dpx, $R_X$, $R_Y$, $R_Z$, $T_Y$, and $T_Z$.

Figure 12A:
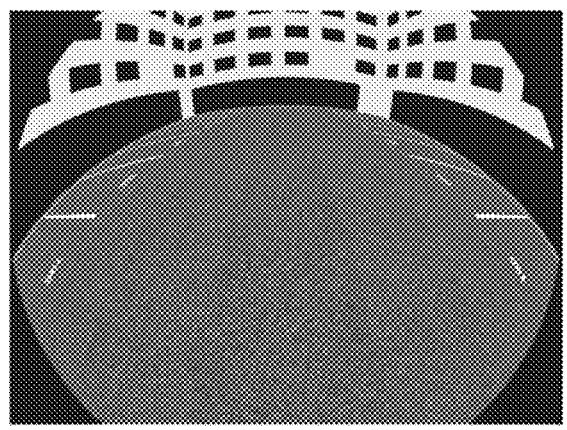
FIG. 12A illustrates an example of an image input in an example of an experiment of self-calibration.
Figure 12B:
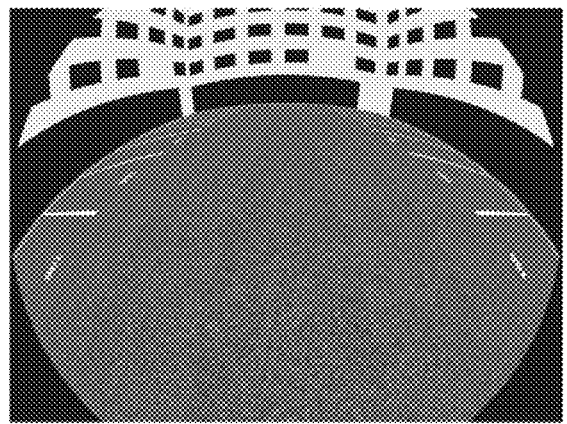
FIG. 12B illustrates an example of an image input in an example of an experiment of self-calibration.

The images used in the experiment are illustrated in FIGS. 12A and 12B. FIGS. 12A and 12B illustrate examples of camera images of scenes in a parking lot. The images are generated by computer graphics (CG). The images illustrated in FIGS. 12A and 12B are the camera images of the cameras 101a and 101b, respectively. In this experiment, instead of calculating the pair of corresponding points in the camera image of FIG. 12A and the camera image of FIG. 12B by the corresponding point calculation unit 902, the known correct solution value of the pair of corresponding points was used.

After setting all of the camera parameters of the cameras 101a and 101b to design values that are the correct solution values by using the correct solution values of the pair of corresponding points as an input value, the evaluation value J was calculated by changing only one of the camera parameters of the camera 101b.

Experimental Result 1

Experimental Result 1 under the above-described experimental condition 1 is described below. More specifically, for nine camera parameters, the evaluation values in the vicinity of the correct solution value were obtained as illustrated in FIGS. 13A to 15B. In FIGS. 13A to 15B, the abscissa represents the value of one of the camera parameters, and the ordinate represents the evaluation value J. The camera parameter that was changed is cu in FIG. 13A, cv in FIG. 13B, fin FIG. 13C, dpx in FIG. 13D, $R_X$ in FIG. 14A, $R_Y$ in FIG. 14B, $R_Z$ in FIG. 14C, $T_Y$ in FIG. 15A, and $T_Z$ in FIG. 15B.

In addition, the correct solution values for the camera parameters are 640 pixels for cu, 480 pixels for cv, 1.12 mm for f, 2.75 μm for dpx, 0° for $R_X$, 0° for $R_Y$, 0° for $R_Z$, 0 mm for $T_Y$, and 0 mm for $T_Z$. In each of FIGS. 13A to 15B, the correct solution value of the camera parameter appears in the middle of the abscissa.

As can be seen from each of FIGS. 13A to 15B, the evaluation function draws a downwardly convex linear shape in the vicinity of the correct solution value of the camera parameter (in the middle of the abscissa), and the camera parameter that minimizes the evaluation value is the same as the correct solution value. As a result, the camera parameters that minimize the evaluation values J can be calculated within the range of the camera parameters illustrated in FIGS. 13A to 15B. That is, camera calibration according to the technique is available.

Figure 13A:
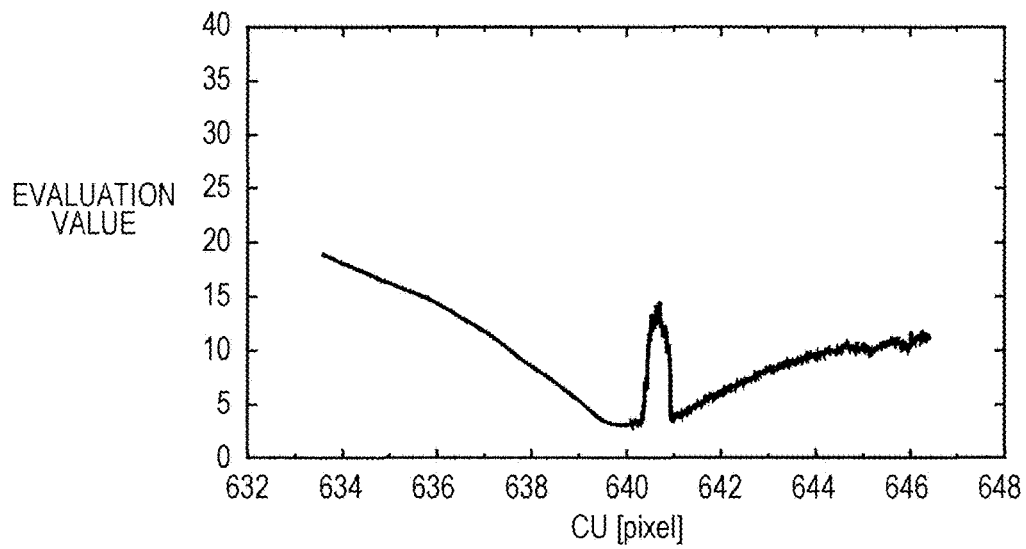
FIG. 13A illustrates an example of a relationship between a camera parameter and an evaluation value in an example of an experiment carried out under Experimental Condition 1 of self-calibration.
Figure 13B:
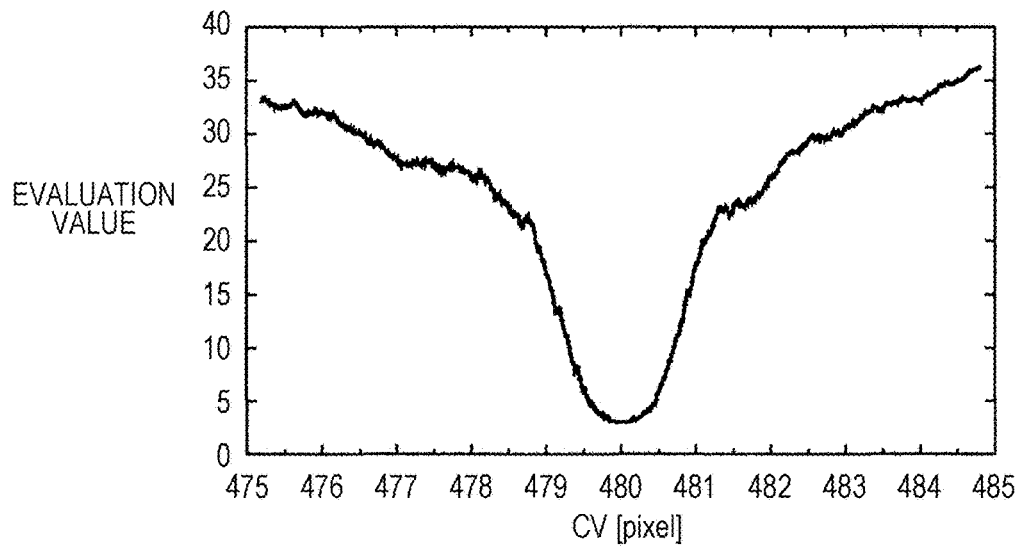
FIG. 13B illustrates an example of a relationship between a camera parameter and an evaluation value in an example of an experiment carried out under Experimental Condition 1 of self-calibration.
Figure 13C:
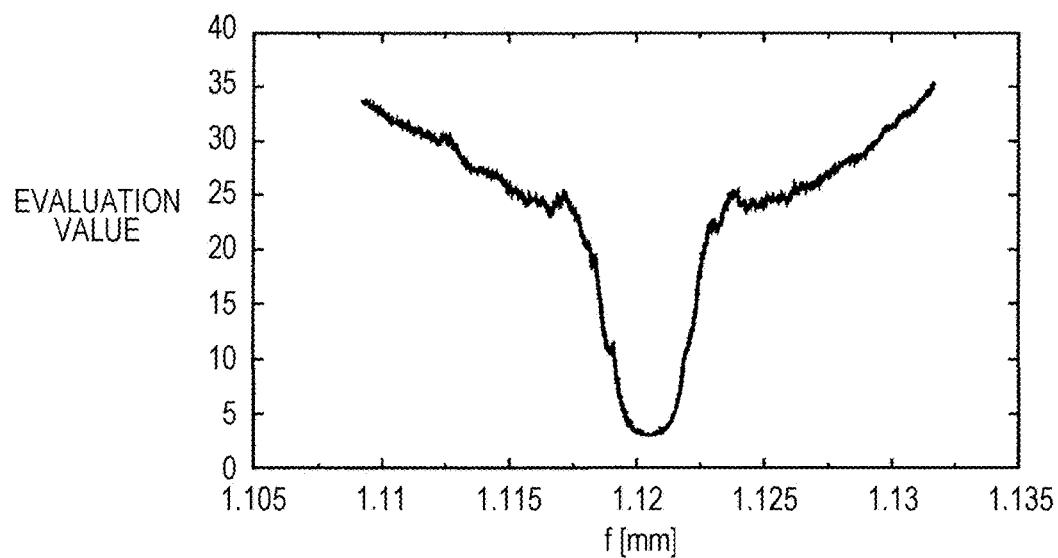
FIG. 13C illustrates an example of a relationship between a camera parameter and an evaluation value in an example of an experiment carried out under Experimental Condition 1 of self-calibration.
Figure 13D:
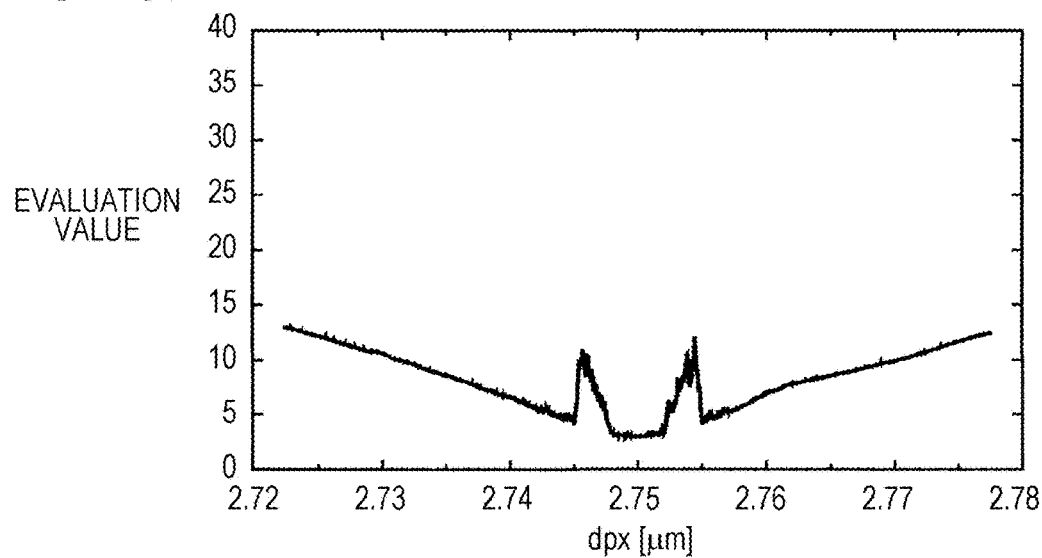
FIG. 13D illustrates an example of a relationship between a camera parameter and an evaluation value in the example of an experiment carried out under Experimental Condition 1 of self-calibration.
Figure 14A:
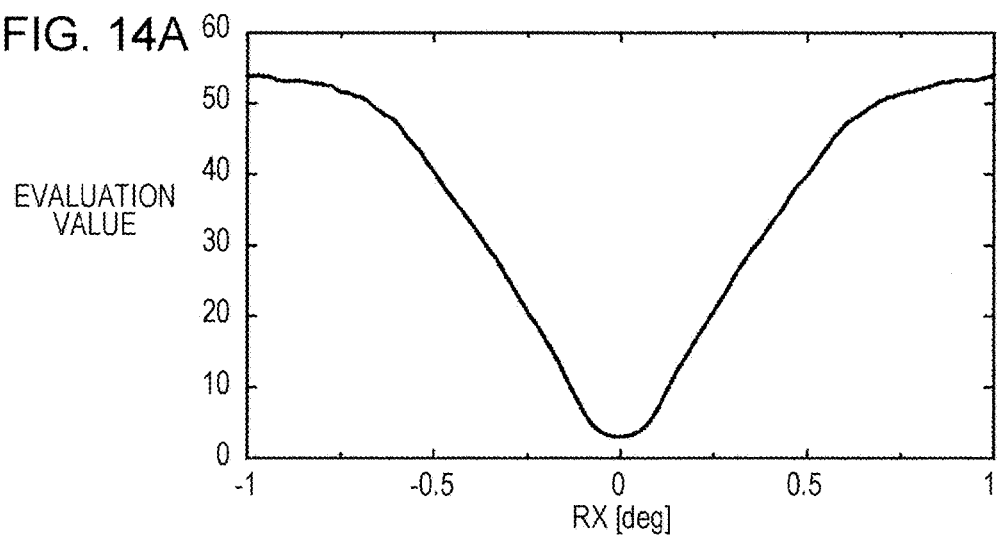
FIG. 14A illustrates an example of a relationship between a camera parameter and an evaluation value in an example of an experiment carried out under Experimental Condition 1 of self-calibration.
Figure 14B:
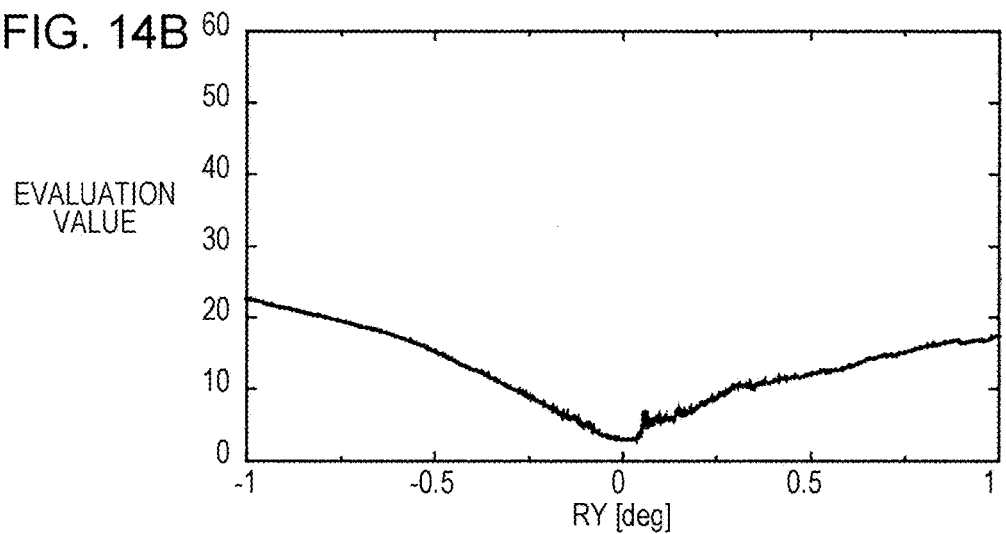
FIG. 14B illustrates an example of a relationship between a camera parameter and an evaluation value in an example of an experiment carried out under Experimental Condition 1 of self-calibration.
Figure 14C:
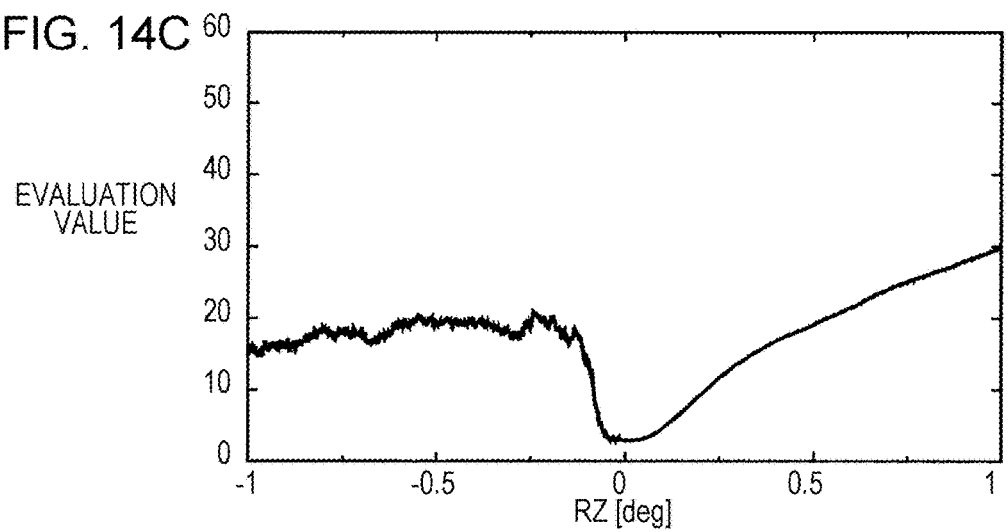
FIG. 14C illustrates an example of a relationship between a camera parameter and an evaluation value in an example of an experiment carried out under Experimental Condition 1 of self-calibration.
Figure 15A:
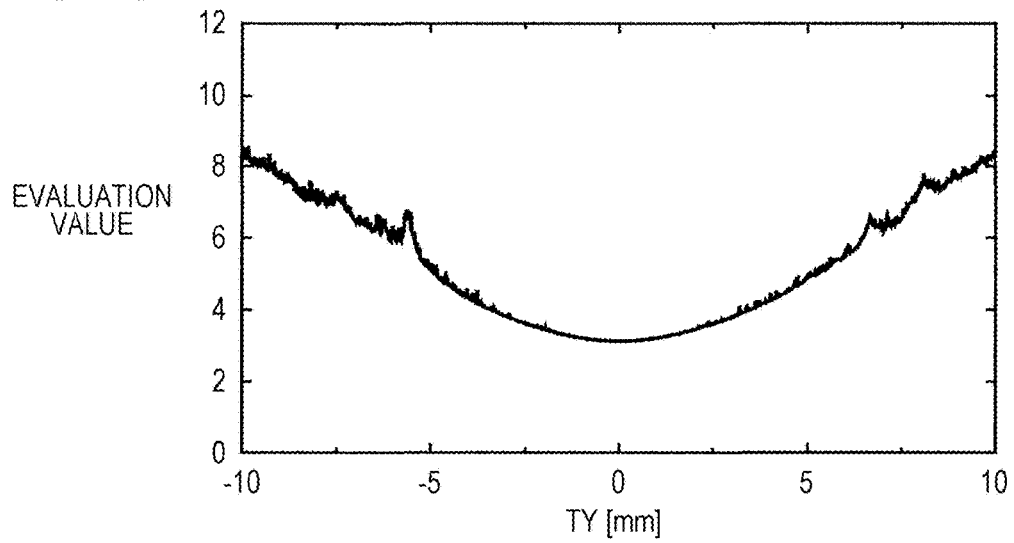
FIG. 15A illustrates an example of a relationship between a camera parameter and an evaluation value in an example of an experiment carried out under Experimental Condition 1 of self-calibration.
Figure 15B:
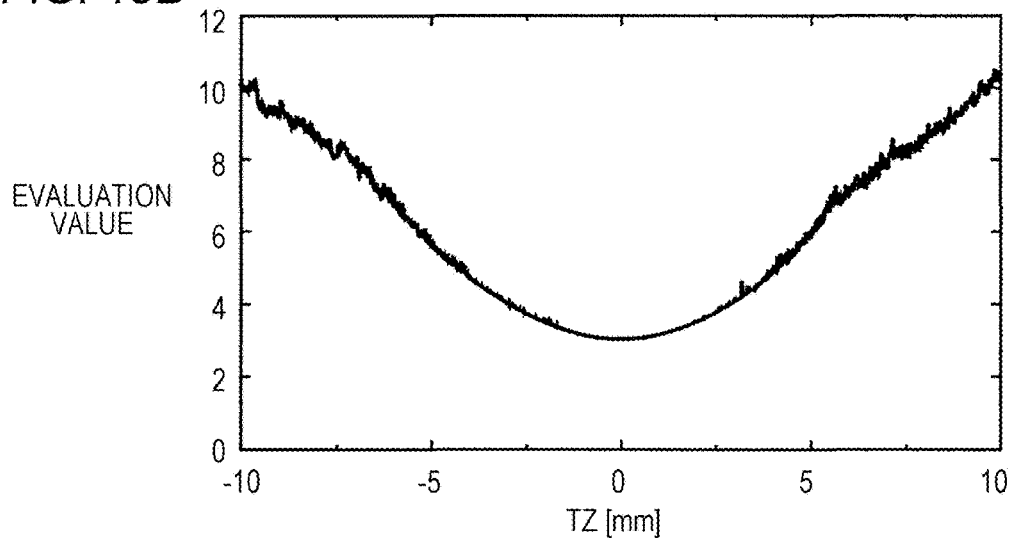
FIG. 15B illustrates an example of a relationship between a camera parameter and an evaluation value in an example of an experiment carried out under Experimental Condition 1 of self-calibration.

For example, with reference to FIG. 13A, in the cu range of 634 to 646 pixels, the evaluation values are calculated while increasing or decreasing cu at regular or random intervals. In addition, the camera parameter cu that provides the smallest evaluation value or the camera parameter cu that provides a sufficiently small evaluation value among the calculated evaluation values is selected as the optimum value. The camera parameter cu selected in this manner is a camera parameter having the correct solution value or a small error from the correct solution value.

As can be seen from the example of the experiment under Experimental Condition 1, the evaluation function defined by Equation (13) satisfies the above-described two conditions (i) and (ii) in the vicinity of the correct solution value.

Experimental Condition 2

Under Experimental Condition 2, an experiment was carried out to calculate the camera parameters so as to reduce an error by performing self-calibration process S111 by using the camera parameter set calculation apparatus 111 of the present disclosure, and the calculation results were verified.

In this experiment, the camera images illustrated in FIGS. 12A and 12B were input to the camera parameter set calculation apparatus 111. In addition, like Experimental Condition 1, a known correct solution value was used as the pair of corresponding points in the two camera images. After all of the camera parameters of the cameras 101a and 101b were set to design values, which are correct solution values, random noise within a predetermined range was added to the nine camera parameters of the camera 101b. The camera parameters having the noise added thereto were used as the initial camera parameters. Evaluation values were calculated while changing only one of the nine parameters of the camera 101b within the predetermined range, and the camera parameter that provided the smallest one of the calculated evaluation values was selected as the optimum value. This process was sequentially repeated for the nine parameters as one test. Thereafter, tests were performed.

Experimental Result 2

Figure 16A:
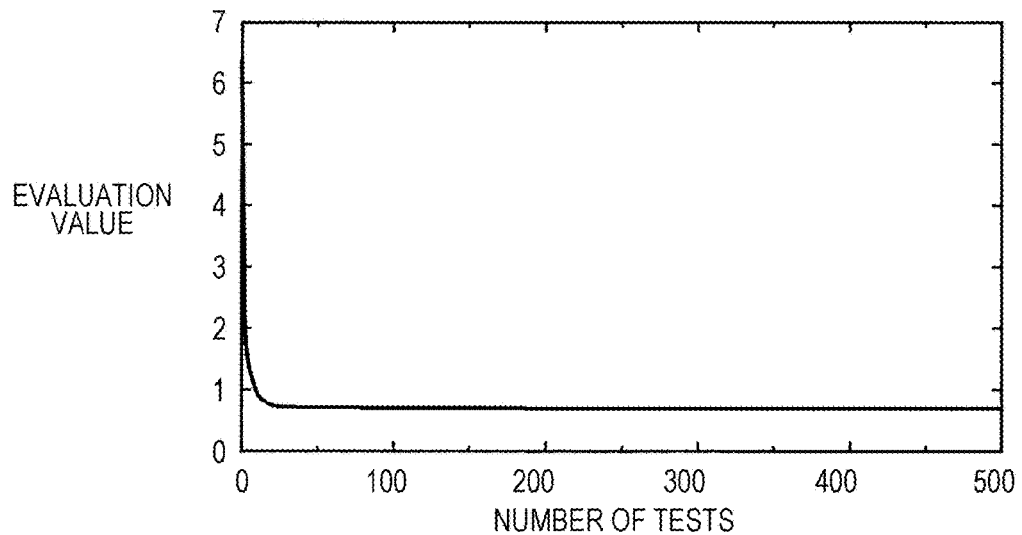
FIG. 16A illustrates an example of a relationship between the number of tests and an evaluation value in an example of an experiment carried out under Experimental Condition 2 of self-calibration.
Figure 16B:
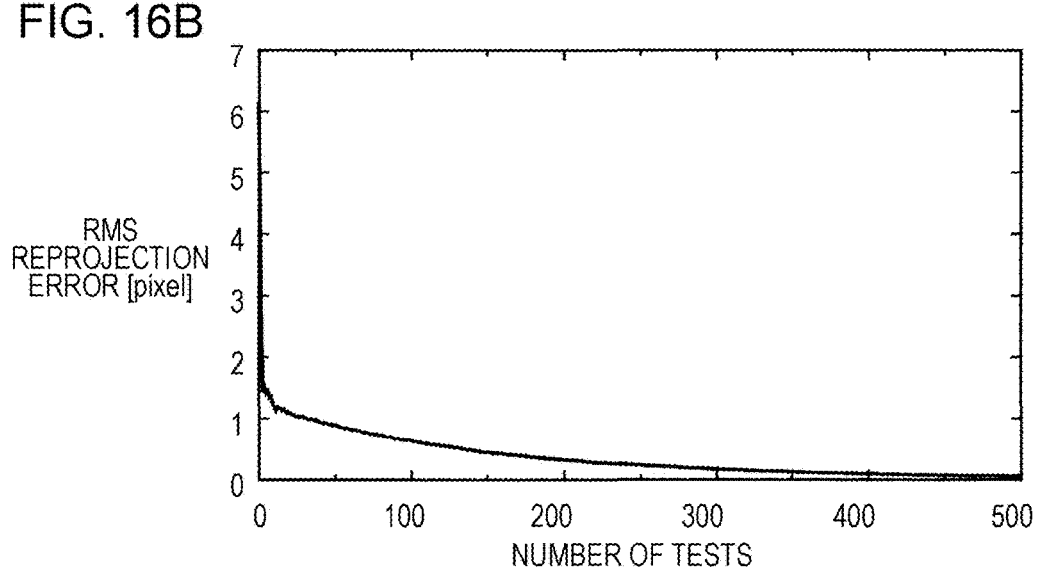
FIG. 16B illustrates an example of a relationship between the number of tests and a reprojection error in an example of an experiment carried out under Experimental Condition 2 of self-calibration.

Experimental Result 2 of the experiment carried out under Experimental Condition 2 is described below. More specifically, an example of Experimental Result 2 was obtained as illustrated in FIGS. 16A and 16B. In FIG. 16A, the abscissa represents the number of tests, and the ordinate represents the evaluation value J in Equation (13). That is, in FIG. 16A, the evaluation value calculated by using the camera parameters obtained by performing the test the number of times indicated by the value on the abscissa is indicated by the value on the ordinate. In FIG. 16B, the abscissa represents the number of tests, and the ordinate represents the RMS value of the reprojection error. The term "reprojection error" refers to the level at which the calculated camera parameters satisfy Equations (1) and (2). More specifically, when the correct solution value of the pair including the three-dimensional coordinate set on the object appearing in the camera image Ib of the camera 101b and the pixel coordinate pairs on the object are known, the pixel coordinate pair obtained by projecting the three-dimensional coordinate set of the correct solution onto the camera image Ib is calculated by using the calculated camera parameters of the camera 101b. The difference between the calculated pixel coordinate pair and the pixel coordinate pair of the correct solution is referred to as a "reprojection error". In other words, as the reprojection error decreases, the camera parameter has a smaller error from the correct solution value so as to satisfy Equation (1) and (2). In both FIGS. 16A and 16B, the evaluation value decreases with increasing number of tests. Thus, the difference between the pixel values at the projection points in the two camera images decreases. At the same time, the reprojection error decreases with increasing number of tests.

As described above, through self-calibration process S111 performed by the camera parameter set calculation apparatus 111 according to the present disclosure, camera parameters that well satisfy Equation (1) and (2) and that have a small error from the correct solution value can be calculated.

As described above, the camera parameters that minimize the evaluation value J in Equation (13) and that are obtained through self-calibration process S111 are camera parameters having the correct solution value or a small error if at least the evaluation function for the evaluation value J satisfies the above-described two conditions (i) and (ii). That is, the following effect is provided: "The correct camera parameter sets of the cameras 101a and 101b can be calculated, and the camera parameter sets can be updated to the correct ones by using two camera images output from the cameras 101a and 101b and the initial camera parameter sets of the cameras 101a and 101b through the processes in step S1001 to S1007 performed by the camera parameter set calculation apparatus 111".

According to an existing calibration technique, since reference points each having a known correspondence between the three-dimensional coordinate set and the pixel coordinate pairs are used, equipment or the like having a calibration index is needed. In contrast, according to the present embodiment, the camera parameter set calculation apparatus 111 extracts a pair of corresponding points by using the camera images captured by two cameras and calculates the three-dimensional coordinate set of a point on the object corresponding to the extracted pair of corresponding point. In addition, the camera parameter set calculation apparatus 111 calculates the projection points of the corresponding points included in the pair in the camera images of the two cameras by using the three-dimensional coordinate set. If the camera parameters are correct, the pixel values of the projection points in the two camera images are the same. As the error in the camera parameter increases, the difference between the pixel values of the projection points of the two camera images increases. Accordingly, the camera parameter set calculation apparatus 111 calculates an optimum camera parameter (that is, a correct camera parameter) by calculating a camera parameter that minimizes the difference between the pixel values of the projection points in the two camera images. In this manner, the camera parameter set calculation apparatus 111 provides an effect of enabling calibration of a camera even when there is no reference point having a known correspondence between the three-dimensional coordinate set and the pixel coordinate pairs, that is, without using equipment having the calibration index or the like.

2-4. Modification 1 of Self-Calibration Operation

Figure 17:
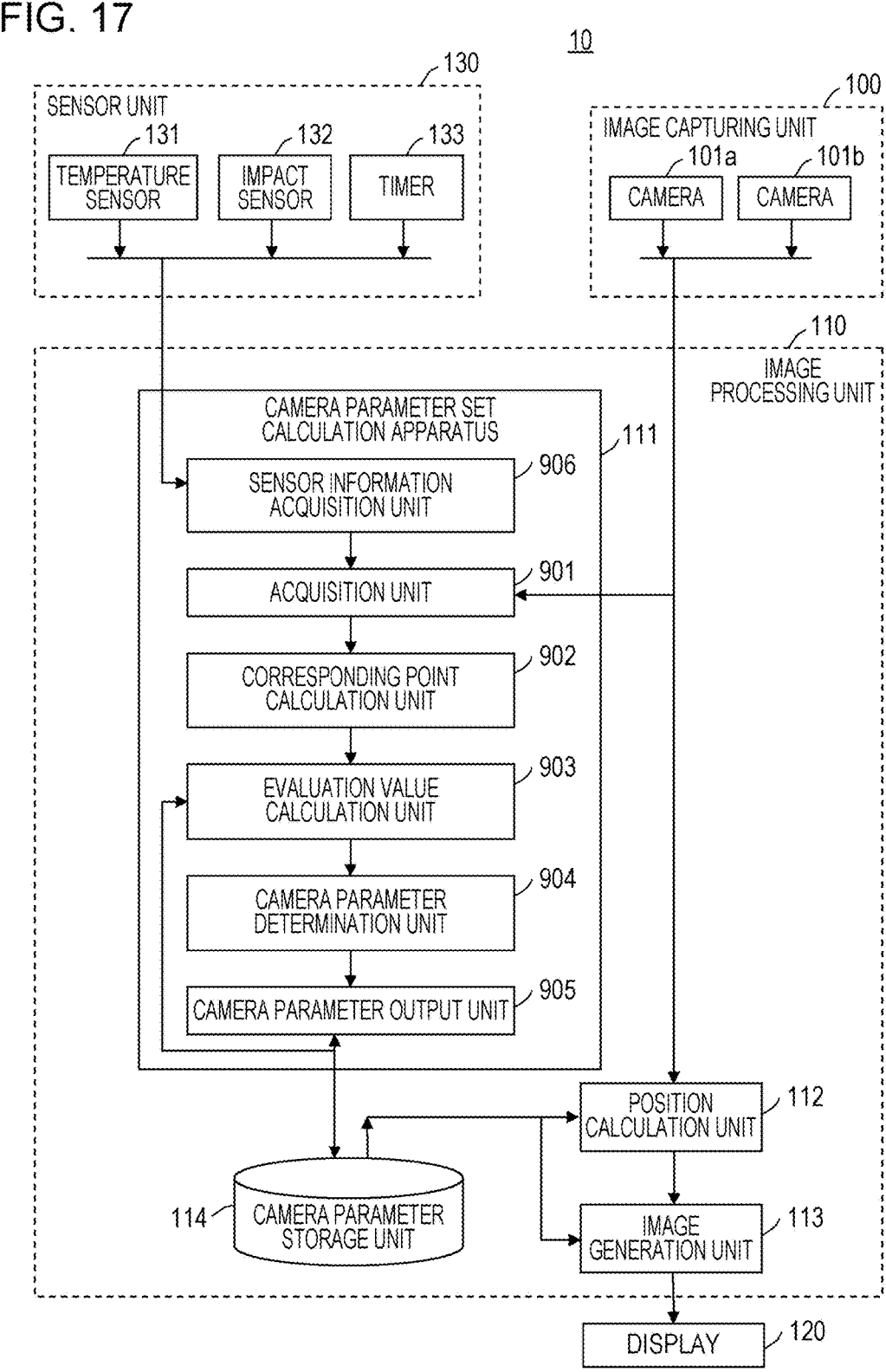
FIG. 17 is a block diagram of the configuration of a compound eye camera system according to Modification 1.

The camera parameter set calculation apparatus 111 according to the embodiment uses the input from the user as a trigger for starting self-calibration process S111. However, the present disclosure is not limited thereto. The camera parameter set calculation apparatus 111 may automatically start self-calibration process S111 by another trigger. For example, the camera parameter set calculation apparatus 111 may automatically start the self-calibration using the input from a sensor, such as a temperature sensor, an impact sensor, or a timer, as a trigger. For example, FIG. 17 is a block diagram of the configuration of a compound eye camera system 10 having a sensor unit 130. In addition to the configuration according to the embodiment, the compound eye camera system 10 includes the sensor unit 130 with a temperature sensor 131, an impact sensor 132, and a timer 133. In addition to the configuration according to the embodiment, the camera parameter set calculation apparatus 111 includes a sensor information acquisition unit 906 that acquires detection information from the sensor unit 130 and outputs a start command to start self-calibration process S111.

The camera parameter set calculation apparatus 111 may perform self-calibration process S111 once immediately after the compound eye camera system 10 is powered on. Note that instead of the above-described operation performed after power-on, the camera parameter set calculation apparatus 111 may perform self-calibration process S111 on the basis of an input from the timer 133 of the sensor unit 130, an input from the impact sensor 132 of the sensor unit 130, or an input from the temperature sensor 131 of the sensor unit 130. The operation triggered by an input from the timer 133 may be performed at regular time intervals detected by the timer 133. The operation triggered by the impact sensor 132 may be performed when the impact sensor 132 detects a strong impact force applied to an automobile having the compound eye camera system 10 mounted therein due to, for example, a traffic accident. The impact sensor 132 may be constituted by an acceleration sensor. The operation triggered by an input from the temperature sensor 131 may be performed when the temperature sensor 131 detects that the temperature around the compound eye camera system 10 has reached a predetermined temperature.

2-5. Modification 2 of Self-Calibration Operation

In self-calibration process S111, the camera parameter set calculation apparatus 111 according to the embodiment extracts N pairs of corresponding points in the camera images Ia and Ib in step S1003. In step S1004, the camera parameter set calculation apparatus 111 calculates the three-dimensional coordinate set of a point on an object corresponding to each of the extracted N pairs of corresponding points by using the stereoscopic range finding technique. Thereafter, the camera parameter set calculation apparatus 111 calculates an evaluation value J by using the calculated three-dimensional coordinate set. However, in calculation of the evaluation value J, the camera parameter set calculation apparatus 111 need not use all of the three-dimensional coordinate sets of the points on the object corresponding to the N pairs of corresponding points According to the present modification, the camera parameter set calculation apparatus 111 removes, from among the three-dimensional coordinate sets of the points on the object each corresponding to one of the N pairs of corresponding points calculated by the stereoscopic range finding technique, that is, the three-dimensional coordinate sets of ranging points, the ones having no luminance gradient or a sufficiently small luminance gradient. In this manner, the camera parameter set calculation apparatus 111 reduces the number of ranging points used to calculate the evaluation value J and, thus, reduces the amount of calculation in calculation of the evaluation value J.

Self-calibration process S111 performed by the camera parameter set calculation apparatus 111 according to the present modification is the same as that according to the embodiment except for the operation in step S1004. Thus, the operation in step S1004 according to the present modification is described below, and descriptions of the other operations are not repeated.

In step S1004, the evaluation value calculation unit 903 of the camera parameter set calculation apparatus 111 calculates the three-dimensional coordinate set $(x_{arn}, y_{arn}, z_{arn})$ of the point on the object corresponding to each of the N pairs of corresponding points, that is, each of the ranging points by using the above-described equation (10), together with the pixel coordinate pairs of the corresponding points included in the N calculated pairs of corresponding points and the camera parameter sets $C_{ar}$ and $C_{br}$ of the cameras 101a and 101b, respectively. Thereafter, the evaluation value calculation unit 903 outputs the calculated three-dimensional coordinate set $(x_{arn}, y_{arn}, z_{arn})$.

In addition, the evaluation value calculation unit 903 projects each of the [0135] ranging points onto the camera images Ia and Ib of the cameras 101a and 101b, respectively, by using the above-described equations (11) and (12), together with the three-dimensional coordinate sets of the N ranging points and the camera parameter sets $C_{ar}$ and $C_{br}$ of the cameras 101a and 101b. More specifically, the pixel coordinate pairs $(u_{arn}, y_{arn})$ and $(u_{brn}, v_{brn})$ in the camera images Ia and Ib, respectively, corresponding to the three-dimensional coordinate set of each of the ranging points are calculated.

Subsequently, the evaluation value calculation unit 903 removes, from the N ranging points, M ranging points each having a zero or sufficiently small luminance gradient of the pixel value at the pixel coordinate pair $(u_{arn}, y_{arn})$ of the projection point obtained by projecting the ranging point onto the camera image Ia. Thus, the evaluation value calculation unit 903 selects the three-dimensional coordinate sets of (N−M) ranging points (M≥0).

If the luminance gradients of the pixel values around the pixel coordinate pair $(u_{arn}, y_{arn})$ corresponding to the three-dimensional coordinate set $(x_{arn}, y_{arn}, z_{arn})$ of the ranging point are 0, the pixel value $Ia(u_{arn}, y_{arn})$ at the pixel coordinate pair does not change even when the camera parameter is slightly changed and, thus, the pixel coordinate pair $(u_{arn}, y_{arn})$ corresponding to the ranging point is slightly changed. That is, the evaluation value J does not change. As a result, even when such a ranging point is removed, the evaluation value J is not influenced by the removal. In addition, since the number of ranging points is reduced, an effect of reducing the amount of computation performed in step S1004 is provided.

Note that to reduce the number of ranging points used to calculate the evaluation value J in step S1004, another technique may be used. For example, from the ranging points, the ranging point that does not appear in one of the images captured by the two cameras 101a and 101b may be removed. In this case, the pixel coordinate pair of the first projection point in the camera image Ia corresponding to the three-dimensional coordinate set of the ranging point and the pixel coordinate pair of the second projection point in the camera image Ib corresponding to the three-dimensional coordinate set of the same ranging point may be calculated. If one of the two pixel coordinate pairs is located in an invisible region of the camera image, the ranging point may be removed from the calculation of the evaluation value J.

When the same ranging point appears in the two camera images Ia and Ib, the above-described equation (13) indicates that the difference between the pixel value of the projection point obtained by projecting the ranging point onto the camera image Ia and the pixel value of the projection point obtained by projecting the same ranging point onto the camera image Ib is 0. However, when one of the first projection point obtained by projecting the ranging point onto the camera image Ia and the second projection point obtained by projecting the same ranging point onto the camera image Ib is in an invisible region of the cameras 101a and an invisible region of the cameras 101b, the above-described equation (13) indicates that even when the ranging point is within the image capturing range, it is likely that the ranging point does not appear in the camera image because it is hidden by another object, that is, it is likely that the first projection point and the second projection point do not represent the same ranging point and, thus, the ranging point and the projection points have an error. In terms of such first and second projection points, even when the camera parameters are correct, the difference between the pixel values of the first projection point and the second projection point is not 0 and, thus, the evaluation value has an error. Accordingly, to reduce the number of ranging points used to calculate the evaluation value J in step S1004, from among the ranging points, the one having the projection point which does not appear in at least one of the camera images, that is, the ranging point located in an invisible region of the camera may be removed from the calculation of the evaluation value. In this manner, an effect of reducing an error in the evaluation value can be provided. It may be determined whether the projection point of a ranging point is in the invisible region of the camera on the basis of the above-mentioned occlusion information that defines the range of the three-dimensional space outside the image capturing range of the camera.

Note that in step S1005 of self-calibration process S111 performed by the camera parameter set calculation apparatus 111, the end of iterative calculation is determined on the basis of whether the evaluation value J is smaller than the first threshold value and whether the process loop count r is greater than the second threshold value. However, the iterative calculation end condition is not limited thereto. For example, another end condition may be added. For example, the end condition may be that the evaluation value J does not change even if the camera parameter set is changed.

Note that in self-calibration process S111 performed by the camera parameter set calculation apparatus 111, if the evaluation function of the evaluation value J satisfies the above-described two conditions, the camera parameter having a small evaluation value J, that is, the camera parameter having a small difference from the correct solution value (i.e., a small error) can be obtained, and the camera parameter can be updated. However, if the evaluation function does not satisfy the above-described two conditions, the camera parameter having a small error is not obtained at all times. For example, if the image capturing range of the camera is extremely dark and, thus, all the pixel values are 0 or if the object has a uniform color and, thus, has no texture, the evaluation value J in the above-described equation (13) remains unchanged and has a constant value (for example, 0) even when the camera parameters are changed. If, in self-calibration process S111, the camera parameter set calculation apparatus 111 acquires such a camera image, the iterative process does not end until the loop count r of steps S1004 to S1006 exceeds the second threshold value. At this time, the evaluation value remains unchanged and is not updated. In this case, although the camera parameters are not updated, a calculation load is imposed on the processing. By ending the iterative process when the evaluation value does not change even if the camera parameter is changed, an effect of reducing the calculation load can be provided.

3. Variation of Evaluation Function

In the self-calibration processing according to the embodiment and the modifications, to calculate the evaluation value J used in self-calibration process S111 performed by the camera parameter set calculation apparatus 111, an evaluation function based on the sum of the absolute values of the differences between pixel values corresponding to ranging points is used as indicated by the above-described equation (13). However, the evaluation function is not limited thereto. Any function based on the differences between the pixel values in two camera images corresponding to the ranging points may be used. For example, the evaluation function may be an evaluation function that uses the sum of the squares of differences between two pixel values in two camera images corresponding to each of ranging points. More specifically, in another function, the squared difference between the pixel value at the first projection point obtained by projecting a ranging point onto the camera image Ia and the pixel value at the second projection point obtained by projecting the same ranging point onto the camera image Ib is obtained for each of the ranging points, and the obtained values are summed. Such a function is given as follows:

$$J = \frac{1}{N}\sum_{k=1}^{N} \{I_a(u_{am}, v_{bm}) - I_b(u_{bm}, v_{bm})\}^2 \qquad (16)$$

The camera parameter calculated on the basis of the evaluation value defined by the sum of the absolute values of the differences between pixel values as indicated by Equation (13) is close to the true value when the distribution of the differences between the pixel values is the Laplacian distribution. That is, an effect of obtaining a small error from the true value can be provided.

In contrast, the camera parameters calculated on the basis of the evaluation value defined by the sum of squared differences in pixel values as indicated by Equation (16) is close to the true value when the distribution of the pixel value error is the Gaussian distribution. That is, an effect of obtaining a small error from the true value can be provided.

Others

While the camera parameter set calculation apparatus according to one or more aspects of the present disclosure has been described with reference to the embodiments, the present disclosure is not limited to the embodiments. Various modifications of the present embodiment that those skilled in the art conceive and an embodiment formed by combining the constituent elements of different embodiments without departing from the spirit of the present disclosure may be encompassed within the scope of one or more aspects of the present disclosure.

While the above embodiments and the modifications have been described with reference to the image capturing unit 100 that is configured with two cameras 101a and 101b, the number of cameras is not limited to two. To perform self-calibration according to the present disclosure, the image capturing unit 100 only needs to include at least two cameras, and any number of cameras more than or equal to two may be used. In addition, the cameras may be integrated into one body or may be separately disposed.

According to the embodiments and the modifications, the image capturing unit 100, the image processing unit 110, and the display 120 of the compound eye camera system 10 are all mounted in an automobile. In addition, the camera parameter set calculation apparatus 111 constituting the image processing unit 110 is mounted in the automobile. However, the configuration is not limited thereto. For example, the image capturing unit 100, the image processing unit 110, and the display 120 may be mounted in any moving body other than an automobile. The moving body may be a vehicle other than an automobile, a ship, a flight vehicle, or the like. The vehicle other than an automobile may be a truck, a bus, a motorcycle, a transport vehicle, a railroad vehicle, a construction machine, a cargo handling machine or the like. The flight vehicle may be an aircraft, a drone or the like.

In addition, the camera parameter set calculation apparatus 111 may be constituted by a computer installed at a different location and connected to the automobile via a network. The camera parameter self-calibration process S111 performed by the camera parameter set calculation apparatus 111 requires a large calculation load. As a result, by performing self-calibration process S111 using a high-performance computer, such as a server, instead of using a computer mounted in the automobile and having a limited performance, an effect of reduction of the calculation time and acquisition of the parameters of a higher accuracy is provided.

Furthermore, as described above, the technique of the present disclosure may be implemented as a system, an apparatus, a method, an integrated circuit, a computer program, a computer-readable recording medium, such as a recording disk, or any selective combination thereof. Examples of the computer-readable recording medium include, but not limited to, a nonvolatile recording medium, such as a CD-ROM.

For example, each of the constituent elements included in the compound eye camera system according to the above-described embodiment is typically provided in the form of an LSI (Large Scale Integration) which is an integrated circuit. The constituent elements may be individually formed as one chip or may be integrated into one chip so as to include some or all of them.

In addition, the circuit integration is not limited to LSI and may be achieved by dedicated circuitry or a general-purpose processor. Alternatively, a field programmable gate array (FPGA), which is programmable after fabrication of the LSI, or a reconfigurable processor which allows reconfiguration of connections and settings of circuit cells in LSI may be used.

In the above-described embodiment, each of the constituent elements may be configured by dedicated hardware or may be provided by executing a software program suitable for the constituent element. Each of the constituent elements may be provided by a program execution unit, such as a CPU or a processor, which reads and executes a software program recorded on a recording medium, such as a hard disk or a semiconductor memory.

In addition, some or all of the constituent elements may be formed from a removable integrated circuit (IC) card or a removable single module. The IC card or the module is a computer system formed from, for example, a microprocessor, a ROM, and a RAM. The IC card or the module may include the above-described LSI or system LSI. When the microprocessor operates in accordance with the computer program, the IC card or the module provides its function. The IC card or the module may be tamper resistant.

The camera parameter set calculation method according to the present disclosure may be achieved by a circuit, such as a micro processing unit (MPU), a CPU, a processor, and an LSI, and an IC card or a single module.

Furthermore, the technique according to the present disclosure may be achieved by a digital signal composed of a software program or a software program or may be a non-transitory computer readable recording medium having a program stored therein. It will be appreciated that the above-mentioned program can be distributed via a transmission medium, such as the Internet.

In addition, the numerical values used above, such as the ordinal numbers and the quantities, are only illustrative examples for describing the technique of the present disclosure, and the present disclosure is not limited to the numerical values given. In addition, the connection relation between the constituent elements is only an illustrative example for describing the technique of the present disclosure, and the connection relation for achieving the functions of the present disclosure is not limited thereto.

Furthermore, the division into functional blocks described in the block diagrams is only illustrative, and functional blocks may be integrated into one functional block, and a single functional block may be divided into functional blocks. In addition, some of the functions may be transferred to another functional block. Still furthermore, the functions of functional blocks having similar functions may be performed by a single hardware configuration or software in parallel or in a time-division multiplexing manner.

The camera parameter calculation apparatus according to the present disclosure is useful for calculating the camera parameters of any compound eye camera having at least two eyes.

What is claimed is:

1. A camera parameter set calculation method comprising:
   (a1) acquiring a first image captured by a first camera and a second image captured by a second camera;
   (a2) acquiring a first camera parameter set including one or more camera parameters of the first camera and a second camera parameter set including one or more camera parameters of the second camera;
   (a3) calculating three-dimensional coordinate sets on an object on a basis of the first image, the second image, the first camera parameter set, and the second camera parameter set, the first image including an image of the object, the second image including an image of the object;
   (a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;
   (a5) calculating an evaluation value on a basis of pixel values at the first pixel coordinate pairs in the first image and pixel values at the second pixel coordinate pairs in the second image;
   (a6) updating the first camera parameter set and the second camera parameter set on a basis of the evaluation value; and
   (a7) outputting the updated first camera parameter set and second camera parameter set,
   wherein at least one of processes (a1) to (a7) is performed by a processor,
   the three-dimensional coordinate sets are represented by $(x1, y1, z1) \ldots (xi, yi, zi) \ldots (xn, yn, zn)$, the first pixel coordinate pairs are represented by $(u11, v11) \ldots (u1i, v1i) \ldots (u1n, v1n)$, and the second pixel coordinate pairs are represented by $(u21, v21) \ldots (u2i, v2i) \ldots (u2n, v2n)$, where $1 < i \leq n$, and $i$ and $n$ are natural numbers,
   the three-dimensional coordinate set $(xi, yi, zi)$ corresponds to the pixel coordinate pair $(u1i, v1i)$, the three-dimensional coordinate set $(xi, yi, zi)$ corresponds to the pixel coordinate pair $(u2i, v2i)$, the pixel value at the pixel coordinate pair $(u1i, v1i)$ is represented by $I1(u1i, v1i)$, and the pixel value at the pixel coordinate pair $(u2i, v2i)$ is represented by $I2(u2i, v2i)$, and
   in process (a5), the evaluation value is calculated on a basis of a difference $Di$ between the pixel values $I1(u1i, v1i)$ and $I2(u2i, v2i)$.

2. The camera parameter set calculation method according to claim 1, wherein in process (a4), the first pixel coordinate pairs are determined by coordinate-transforming each of the three-dimensional coordinate sets using one or more camera parameters included in the first camera parameter set, and the second pixel coordinate pairs are determined by coordinate-transforming each of the three-dimensional coordinate sets using one or more camera parameters included in the second camera parameter set.

3. The camera parameter set calculation method according to claim 1, wherein in process (a5), the evaluation value is calculated on a basis of $\Sigma_{i=1}^{n} Di$.

4. The camera parameter set calculation method according to claim 1, wherein in process (a5), the evaluation value is calculated on a basis of $\Sigma_{i=1}^{n} |Di|$.

5. The camera parameter set calculation method according to claim 1, wherein in process (a5), the evaluation value is calculated on a basis of $\Sigma_{i=1}^{n} (Di \times Di)$.

6. The camera parameter set calculation method according to claim 1, wherein (b1) information about detected temperature is acquired from a temperature sensor before processes (a1) to (a7) are performed, and
   wherein (b2) processes (a1) to (a7) are started on a basis of the acquired information about detected temperature.

7. The camera parameter set calculation method according to claim 1, wherein (c1) information about detected impact is acquired from an impact sensor before processes (a1) to (a7) are performed, and
   wherein (c2) processes (a1) to (a7) are started on a basis of the acquired information about detected impact.

8. The camera parameter set calculation method according to claim 1, wherein (d1) information about time is acquired from a timer before processes (a1) to (a7) are performed, and
   wherein (d2) processes (a1) to (a7) are started on a basis of the acquired information about time.

9. A camera parameter set calculation method comprising:
   (a1) acquiring a first image captured by a first camera and a second image captured by a second camera;
   (a2) acquiring a first camera parameter set including one or more camera parameters of the first camera and a second camera parameter set including one or more camera parameters of the second camera;
   (a3) repeating estimation of a pair of corresponding points that are a first corresponding point in the first image and a second corresponding point in the second image, to determine which points in the first image and in the second image indicates images of an identical point on the object, based on a pixel value at the first corresponding point and a pixel value at the second corresponding point, thereby pairs of corresponding points being provided;
   (a4) calculating three-dimensional coordinate sets each corresponding to the pairs of corresponding points on a basis of the first camera parameter set and the second camera parameter set;
   (a5) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a6) calculating an evaluation value on a basis of pixel values at the first pixel coordinate pairs in the first image and pixel values at the second pixel coordinate pairs in the second image;

(a7) updating the first camera parameter set and the second camera parameter set on a basis of the evaluation value; and (a8) outputting the updated first camera parameter set and second camera parameter set, wherein at least one of processes (a1) to (a8) is performed by a processor, the three-dimensional coordinate sets are represented by (x1, y1, z1) . . . (xi, yi, zi) . . . (xn, yn, zn), the first pixel coordinate pairs are represented by (u11, v11) . . . (u1i, v1i) . . . (u1n, vin), and the second pixel coordinate pairs are represented by (u21, v21) . . . (u2i, v2i) . . . (u2n, v2n), where 1<i≤n, and i and n are natural numbers, the three-dimensional coordinate set (xi, yi, zi) corresponds to the pixel coordinate pair (u1i, v1i), the three-dimensional coordinate set (xi, yi, zi) corresponds to the pixel coordinate pair (u2i, v2i), the pixel value at the pixel coordinate pair (u1i, v1i) is represented by I1(u1i, v1i), and the pixel value at the pixel coordinate pair (u2i, v2i) is represented by I2(u2i, v2i), and in process (a6), the evaluation value is calculated on a basis of a difference Di between the pixel values I1(u1i, v1i) and I2(u2i, v2i).

10. A non-transitory computer-readable recording medium storing a control program executable by an apparatus including a processor, the control program comprising code to perform:

(a1) acquiring a first image captured by a first camera and a second image captured by a second camera;

(a2) acquiring a first camera parameter set including one or more camera parameters of the first camera and a second camera parameter set including one or more camera parameters of the second camera;

(a3) calculating three-dimensional coordinate sets on an object on a basis of the first image, the second image, the first camera parameter set, and the second camera parameter set, the first image including an image of the object, the second image including an image of the object;

(a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a5) calculating an evaluation value on a basis of pixel values at the first pixel coordinate pairs in the first image and pixel values at the second pixel coordinate pairs in the second image;

(a6) updating the first camera parameter set and the second camera parameter set on a basis of the evaluation value; and (a7) outputting the updated first camera parameter set and second camera parameter set, wherein the three-dimensional coordinate sets are represented by (x1, y1, z1) . . . (xi, yi, zi) . . . (xn, yn, zn), the first pixel coordinate pairs are represented by (u11, v11) . . . (u1i, v1i) . . . (u1n, vin), and the second pixel coordinate pairs are represented by (u21, v21) . . . (u2i, v2i) . . . (u2n, v2n), where 1<i≤n, and i and n are natural numbers, the three-dimensional coordinate set (xi, yi, zi) corresponds to the pixel coordinate pair (u1i, v1i), the three-dimensional coordinate set (xi, yi, zi) corresponds to the pixel coordinate pair (u2i, v2i), the pixel value at the pixel coordinate pair (u1i, v1i) is represented by I1(u1i, v1i), and the pixel value at the pixel coordinate pair (u2i, v2i) is represented by I2(u2i, v2i), and in process (a5), the evaluation value is calculated on a basis of a difference Di between the pixel values I1(u1i, v1i) and I2(u2i, v2i).

11. A camera parameter set calculation apparatus comprising a processing circuit that performs the following operations:

(a1) acquiring a first image captured by a first camera and a second image captured by a second camera;

(a2) acquiring a first camera parameter set including one or more camera parameters of the first camera and a second camera parameter set including one or more camera parameters of the second camera;

(a3) calculating three-dimensional coordinate sets on an object on a basis of the first image; the second image; the first camera parameter set; and the second camera parameter set, the first image including an image of the object, the second image including an image of the object;

(a4) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a5) calculating an evaluation value on a basis of pixel values at the first pixel coordinate pairs in the first image and pixel values at the second pixel coordinate pairs in the second image;

(a6) updating the first camera parameter set and the second camera parameter set on a basis of the evaluation value; and (a7) outputting the updated first camera parameter set and second camera parameter set, wherein the three-dimensional coordinate sets are represented by (x1, y1, z1) . . . (xi, yi, zi) . . . (xn, yn, zn), the first pixel coordinate pairs are represented by (u11, v11) . . . (u1i, v1i) . . . (u1n, vin), and the second pixel coordinate pairs are represented by (u21, v21) . . . (u2i, v2i) . . . (u2n, v2n), where 1<i≤n, and i and n are natural numbers, the three-dimensional coordinate set (xi, yi, zi) corresponds to the pixel coordinate pair (u1i, v1i), the three-dimensional coordinate set (xi, yi, zi) corresponds to the pixel coordinate pair (u2i, v2i), the pixel value at the pixel coordinate pair (u1i, v1i) is represented by I1(u1i, v1i), and the pixel value at the pixel coordinate pair (u2i, v2i) is represented by I2(u2i, v2i), and in process (a5), the evaluation value is calculated on a basis of a difference Di between the pixel values I1(u1i, v1i) and I2(u2i, v2i).

12. A camera parameter set calculation apparatus comprising a processing circuit that performs the following operations:

(a1) acquiring a first image captured by a first camera and a second image captured by a second camera;

(a2) acquiring a first camera parameter set including one or more camera parameters of the first camera and a second camera parameter set including one or more camera parameters of the second camera;

(a3) repeating estimation of a pair of corresponding points that are a first corresponding point in the first image and a second corresponding point in the second image, to determine which points in the first image and in the second image indicates images of an identical point on the object, based on a pixel value at the first corresponding point and a pixel value at the second corresponding point, thereby pairs of corresponding points being provided;

(a4) calculating three-dimensional coordinate sets each corresponding to the pairs of corresponding points on a basis of the first camera parameter set and the second camera parameter set;

(a5) determining first pixel coordinate pairs obtained by projecting the three-dimensional coordinate sets onto the first image on a basis of the first camera parameter set and determining second pixel coordinate pairs obtained by projecting the three-dimensional coordinate sets onto the second image on a basis of the second camera parameter set;

(a6) calculating an evaluation value on a basis of pixel values at the first pixel coordinate pairs in the first image and pixel values at the second pixel coordinate pairs in the second image;

(a7) updating the first camera parameter set and the second camera parameter set on a basis of the evaluation value; and (a8) outputting the updated first camera parameter set and second camera parameter set, wherein the three-dimensional coordinate sets are represented by $(x1, y1, z1) \ldots (xi, yi, zi) \ldots (xn, yn, zn)$, the first pixel coordinate pairs are represented by $(u11, v11) \ldots (u1i, v1i) \ldots (u1n, v1n)$, and the second pixel coordinate pairs are represented by $(u21, v21) \ldots (u2i, v2i) \ldots (u2n, v2n)$, where $1 < i \leq n$, and i and n are natural numbers, the three-dimensional coordinate set $(xi, yi, zi)$ corresponds to the pixel coordinate pair $(u1i, v1i)$, the three-dimensional coordinate set $(xi, yi, zi)$ corresponds to the pixel coordinate pair $(u2i, v2i)$, the pixel value at the pixel coordinate pair $(u1i, v1i)$ is represented by $I1(u1i, v1i)$, and the pixel value at the pixel coordinate pair $(u2i, v2i)$ is represented by $I2(u2i, v2i)$, and in process (a6), the evaluation value is calculated on a basis of a difference $Di$ between the pixel values $I1(u1i, v1i)$ and $I2(u2i, v2i)$.

\* \* \* \* \*